US011976690B2

(12) United States Patent
Lampaert et al.

(10) Patent No.: US 11,976,690 B2
(45) Date of Patent: May 7, 2024

(54) SELF-HEALING BEARING DEVICE USING ELECTRIC OR MAGNETIC FLUIDS

(71) Applicant: Bifröst Research and Development B.V., Wijk Bij Duurstede (NL)

(72) Inventors: Stefan George Emile Lampaert, Delft (NL); Ronald Adrianus Johannes Van Ostayen, Delft (NL); Maarten Cornelis De Graaf, Delft (NL)

(73) Assignee: Bifröst Research and Development B.V., Wijk bij Duurstede (NL)

( * ) Notice: Subject to any disclaimer, the term of this patent is extended or adjusted under 35 U.S.C. 154(b) by 166 days.

(21) Appl. No.: 17/765,178

(22) PCT Filed: Sep. 29, 2020

(86) PCT No.: PCT/EP2020/077249
§ 371 (c)(1),
(2) Date: Mar. 30, 2022

(87) PCT Pub. No.: WO2021/069260
PCT Pub. Date: Apr. 15, 2021

(65) Prior Publication Data
US 2022/0373031 A1 Nov. 24, 2022

(30) Foreign Application Priority Data
Oct. 7, 2019 (NL) ..................................... 2023974

(51) Int. Cl.
*F16C 33/74* (2006.01)
*C10M 171/00* (2006.01)
(Continued)

(52) U.S. Cl.
CPC ....... *F16C 33/746* (2013.01); *C10M 171/001* (2013.01); *F16C 17/02* (2013.01);
(Continued)

(58) Field of Classification Search
CPC .. F16C 32/0637; F16C 33/109; F16C 33/746; F16C 2210/06; F16C 2237/00
See application file for complete search history.

(56) References Cited

U.S. PATENT DOCUMENTS

| 7,736,063 | B1 | 6/2010 | Reitz et al. |
| 7,980,765 | B2 * | 7/2011 | Reitz ..................... F16C 33/109 384/627 |

(Continued)

FOREIGN PATENT DOCUMENTS

| CN | 101135342 A | 3/2008 |
| CN | 102392851 A | 3/2012 |

(Continued)

OTHER PUBLICATIONS

International Search Report and Written Opinion dated Jan. 15, 2021 for Application No. PCT/EP2020/077249.

(Continued)

*Primary Examiner* — James Pilkington
(74) *Attorney, Agent, or Firm* — Patterson + Sheridan, LLP

(57) ABSTRACT

A bearing device with first and second bearing surfaces facing each other and which are moveable relative to one another. The first and second bearing surfaces are separated by a bearing gap filled with a lubricant. The lubricant comprises a carrier fluid and particles which respond to magnetic or electric fields. The particles are suspended in the carrier fluid in the absence of magnetic or electric fields. One or more magnetic or electric field generators are embedded in the first or second bearing surface to generate a localized magnetic or electric field which locally removes the particles from suspension by exerting a field force on the particles. This forms a local flow obstruction on at least one of the bearing surfaces in the form of an agglomerate of previously (Continued)

suspended particles. The local flow obstruction locally obstructs a flow of the lubricant.

24 Claims, 22 Drawing Sheets

(51) Int. Cl.
| | |
|---|---|
| *F16C 17/02* | (2006.01) |
| *F16C 32/06* | (2006.01) |
| *F16C 33/10* | (2006.01) |
| *C10N 20/06* | (2006.01) |
| *C10N 30/00* | (2006.01) |
| *C10N 40/02* | (2006.01) |
| *C10N 40/14* | (2006.01) |
| *C10N 40/18* | (2006.01) |

(52) U.S. Cl.
CPC ........ *F16C 32/0637* (2013.01); *F16C 33/109* (2013.01); *C10N 2020/06* (2013.01); *C10N 2030/60* (2020.05); *C10N 2040/02* (2013.01); *C10N 2040/14* (2013.01); *C10N 2040/18* (2013.01)

(56) References Cited

U.S. PATENT DOCUMENTS

| | | | |
|---|---|---|---|
| 11,261,912 B2 * | 3/2022 | Lampaert | ............ F16C 32/0666 |
| 2010/0247012 A1 | 9/2010 | Reitz et al. | |
| 2012/0256135 A1 | 10/2012 | Green et al. | |
| 2013/0186473 A1 | 7/2013 | Mankame et al. | |

FOREIGN PATENT DOCUMENTS

| | | |
|---|---|---|
| CN | 104879384 A | 9/2015 |
| DE | 102010019285 A1 | 11/2011 |
| DE | 102012004586 A1 | 9/2013 |
| EP | 0206516 A2 | 12/1986 |
| GB | 1413118 A | 11/1975 |
| JP | 2013096506 A | 5/2013 |
| KR | 19990086637 A | 12/1999 |
| WO | 2009-049070 A2 | 4/2009 |
| WO | 2013-066562 A2 | 5/2013 |
| WO | 2018-212657 A1 | 11/2018 |

OTHER PUBLICATIONS

Netherlands Search Report and Written Opinion dated Jun. 23, 2020 for Application No. NL2023974.

Chinese Office Action dated Sep. 24, 2023, for Chinese Patent Application No. 202080070603.2.

* cited by examiner

SELF-HEALING BEARING DEVICE USING ELECTRIC OR MAGNETIC FLUIDS

FIELD OF THE INVENTION

The present invention relates to a bearing device having a lubricant which comprises particles which respond to external magnetic or electric fields. The bearing device comprises one or more magnetic or electric field generators for creating one or more magnetic or electric fields.

BACKGROUND OF THE INVENTION

Many different bearing devices with lubricants exist. These bearing devices are widely used in machinery, including vessels, power plants, and vehicles such as cars and other machinery. Bearing devices allow relative movement between two parts of a device.

Bearing devices can be classified as hydrostatic, hydrodynamic or hybrid. Each of these has specific advantages and disadvantages. It is noted that the term "bearing device" in the context of the present document is intended to be limited to bearing devices without roller elements such as ball bearings. In other words, the load between the stationary part of the bearing device and the moving part of the bearing device is transferred by the lubricant.

The hydrostatic bearing usually comprises a restrictor, a recess and a land area. A high-pressure lubricant is supplied to the recess via a restrictor to consequently flow through the land area out of the bearing. The pressure of the lubricant is fairly constant in the recess area and decreases over the land area. An advantage of a hydrostatic bearing device is that in use there will never be any contact between the stationary part and the moving part, regardless of whether the moving part moves or not. A disadvantage of a hydrostatic bearing device is that the hydrostatic bearing device requires a continuous supply of lubricant by an external pressurized source. If the source malfunctions, the pressure of the lubricant in the bearing is lost. The parts may come into contact and as a consequence the bearing may become damaged or become subject to wear.

A further disadvantage of a hydrostatic bearing device is that for a high load capacity it is desired to have a large recess area and a small land area. This has as a drawback that the bearing has a low dynamic stiffness and a low squeeze film damping. The pad and recess are generally created with so-called "surface texturing", geometric surface variation resulting in a local lubricant film thickness variation. This surface texturing requires very precise machining to achieve the desired surface finish. Furthermore, because of the requirement of very precise machining and the very small thickness of the texture, the surface texturing is also vulnerable to wear and tear in case the moving part and the stationary part come in contact with one another.

An advantage of a hydrodynamic bearing device is that for optimal operation it requires no surface texturing. The surfaces of the stationary and moving part can be completely smooth which is easier to manufacture. A further advantage is that a hydrodynamic bearing device does not require a pressurized supply of lubricant. This reduces the risk of failure.

A disadvantage of a hydrodynamic bearing is that the working is dependent on the formation of hydrodynamic pressure. This pressure is only formed when the moveable part moves relative to the stationary part. When the moveable part does not move or moves too slowly, physical contact between the moveable part and stationary part occurs, resulting in friction and wear and tear of the parts. This occurs in particular during start-up or slowdown of the machine when the relative speed of the parts is low. In other words, a hydrodynamic bearing needs to have sufficient speed in order to work.

It is noted that hydrodynamic bearing devices generally also have a source of lubricant in order to prevent the bearing device from becoming empty. However, for a hydrodynamic bearing device the pressure with which the lubricant enters into the bearing is much lower, and does not contribute significantly to the load bearing capacity of the hydrodynamic bearing. Instead the load bearing capacity is formed by the hydrodynamic pressure created by the relative sliding of the rotary parts.

Hybrid bearings exist which combine some of the advantages of hydrostatic and hydrodynamic bearings. However, the performance of hybrid bearings is limited. Hybrid bearings generally have limited surface texturing, because the surface texturing that is required for a hydrostatic bearing limits the performance of a hydrodynamic bearing. Performance in the dynamic working regime is reasonable, because the surface texturing is only limited. On the other hand, performance in the static working regime is also limited because of this same reason. The hybrid bearing thus represents a compromise between a hydrostatic bearing and a hydrodynamic bearing. Also, the hydrostatic working regime requires a pump which is sensitive to failure.

Bearing devices can also be classified according to their shape and the movement they allow. A journal bearing typically surrounds a rotary shaft and provides support in a radial direction. A journal bearing can be referred to as a radial bearing. A thrust bearing also surrounds a rotary shaft but provides support in the axial direction of the shaft. A thrust bearing can be referred to as an axial bearing. Flat bearings have a flat bearing surface and provide support in a direction orthogonal to the flat bearing surface. A thrust bearing is an example of a flat bearing. Conical bearings also exist. Conical bearings form a hybrid between a journal bearing and a thrust bearing and can transfer both an axial load and a radial load. Often conical bearings are provided in a pair wherein the first and second conical bearing taper in opposite directions.

It is a longstanding objective to improve bearing lubrication in order to reduce wear and tear of the various parts of bearing devices. In the past bearing devices using a lubricant having electrorheological or magnetorheological characteristics have been disclosed. An electrorheological lubricant (ERL) is a lubricant which comprises electrically polarizable particles which are suspended in the liquid. A magnetorheological lubricant (MRL) is a lubricant which comprises magnetically polarizable particles which are suspended in the liquid.

These bearing devices comprise activators for increasing the viscosity of the lubricant in order to improve the lubrication of the bearing device.

The document WO2018212657A1 filed by the same applicant as the present document discloses a bearing device in which a magnetorheological or electrorheological fluid is used as a lubricant. The lubricant is confined to certain regions by using local control of the lubricant viscosity. One method used is to encircle a bearing gap lubricant supply by activators, thereby inhibiting lubricant flow out of the thus formed enclosure, increasing the pressure throughout said enclosure. This increases the load carrying capacity of the bearing, while using relatively few activators and avoiding the use of surface texturing.

Another disclosure of use of electrorheological fluids in bearing devices is U.S. Pat. No. 7,980,765B2. Here, activators are used to induce zones of increased viscosity, inhibiting lubricant flow and locally increasing pressure, increasing a load carrying capacity of the bearing.

It was recognized in the present invention that a disadvantage of bearing devices using lubricants wherein the viscosity may be controlled by activators, such as magnetorheological or electrorheological fluids, is that the choice of lubricant is restricted to fluids with such properties. This may force one to use a lubricant which has suboptimal properties, for instance with respect to lubrication performance, longevity, environmental impact, and/or cost.

OBJECT OF THE INVENTION

It is an object of the present invention to provide a bearing device which combines a number of advantages of hydrostatic bearing devices and hydrodynamic bearing devices with the advantages of the bearing devices as disclosed in WO2018212657A1 but without the requirement that the viscosity of the lubricant should be controlled.

It is a further object of the present invention to provide an improved hydrostatic bearing, with relatively little leakage, without a physical land and pad and which allows the use of a lubricant of high quality, resulting in relatively little wear and tear.

It is a further object of the present invention to provide an improved hydrodynamic bearing in which dynamic pressure is created without texturing, which has relatively little leakage and which allows the use of a lubricant of high quality, resulting in relatively little wear and tear.

It is a further object of the present invention to provide a bearing device which provides similar benefits when compared to bearing devices in which the viscosity of the lubricant may be locally controlled, while allowing more freedom in choosing the optimal lubricant, thus optimizing lubricating properties.

It is a further object of the present invention to provide a journal bearing device which combines the easy mounting and tolerance for mis-alignment of a journal bearing with a large clearance, with the high performance of a journal bearing with a small clearance.

It is a further object of the present invention to provide a bearing device which is efficiently operable under varying conditions such as load, speed, temperature, and pressure.

It is a further object of the present invention to provide a bearing device which is an alternative to the prior art.

SUMMARY OF THE INVENTION

In order to achieve at least one of the objects the invention relates to a bearing device comprising:
a first bearing surface and a second bearing surface which are moveable relative to one another and which face one another, wherein the first bearing surface and second bearing surface are separated by a bearing gap filled with a lubricant, wherein the lubricant comprises a carrier fluid and particles which respond to magnetic fields,
wherein said particles are suspended in the carrier fluid in the absence of magnetic fields,
one or more field generators which are embedded in the first or second bearing surface, wherein the field generators are magnetic field generators configured to generate a localized spatially varying magnetic field which is configured to locally remove the particles from suspension by exerting a field force on the particles, thereby forming a local flow obstruction on at least one of the bearing surfaces in the form of an agglomerate of previously suspended particles, wherein the local flow obstruction is configured to locally obstruct a flow of the lubricant through the bearing gap in an obstruction zone.

In a separate independent embodiment, the invention also relates to a bearing device comprising:
a first bearing surface and a second bearing surface which are moveable relative to one another and which face one another, wherein the first bearing surface and second bearing surface are separated by a bearing gap filled with a lubricant, wherein the lubricant comprises a carrier fluid and particles which respond to electric fields,
wherein said particles are suspended in the carrier fluid in the absence of electric fields,
one or more field generators which are embedded in the first or second bearing surface, wherein the field generators are electric field generators configured to generate a localized electric field which is configured to locally remove the particles from suspension by exerting a field force on the particles, thereby forming a local flow obstruction on at least one of the bearing surfaces in the form of an agglomerate of previously suspended particles, wherein the local flow obstruction is configured to locally obstruct a flow of the lubricant through the bearing gap in an obstruction zone.

Unlike in the case of a magnetic field, when an electric field is used, a spatially homogeneous field can exert a net electric field force on the particles. This is due to the fact that magnetic monopoles do not exist, while electric monopoles do exist.

The skilled person will understand that in case of magnetic field generators the field force will be a magnetic force and in case of electric field generators the field force will be an electric force.

An important difference between magnetorheological bearing devices and electrorheological bearing devices known from the prior art on the one hand, and a bearing device according to the present invention, is that the physical effects taking place in the lubricant are different. Magnetorheological and electrorheological bearing devices comprise a lubricant with bipolar particles, which form chains of particles when subjected to a magnetic or electric field, dependent on whether the bipolar particles comprise a magnetic dipole or an electric dipole. These chains align with the field lines of the field. The chains increase the viscosity of the lubricant in areas where the magnetic or electric field is present. In a stronger field, the chains will be stronger, resulting in a higher viscosity.

In a bearing device according to the invention, a lubricant is used comprising particles that may be removed from suspension by a magnetic or electric field. In these bearing devices, the particles are pulled from suspension towards or away from the field generators to form agglomerates on a bearing surface. In order for this to occur, a net magnetic or electric field force must be applied to the particles. This is markedly different from magnetorheological and electrorheological bearing devices, where no net field force on the particles needs to be applied by the field; the field only aligns the particles, while the particles attract each other to form chains.

Because a net field force is to be applied to the particles in a bearing device according to the invention, a spatial field gradient of sufficient magnitude is required when particles comprising a magnetic or electric dipole are used, since a spatially homogeneous field exerts no net field force on a dipole. When using particles comprising an electric monopole, a homogeneous electric field may be used. Using a homogeneous magnetic field is not possible, since magnetic monopoles do not exist or at least have not yet been found.

In a magnetorheological or electrorheological bearing device, the field strength determines the torque exerted on the particles in the lubricant. The higher this torque, the stronger the chains and the higher the viscosity of the lubricant will be. In a bearing device according to the invention, the net field force exerted on the particles by the field determines the size of the agglomerates. With a larger net field force, the equilibrium between agglomerating particles and particles washing away by the lubricant flowing past the agglomerate shifts towards larger agglomerates. The net field force exerted on the particles by the field must be above a certain threshold value in order to hold the particles in place against the drag force of the flowing lubricant. It will be understood that this threshold value of the net field force is dependent on at least the rpm of the bearing device and the viscosity of the lubricant. If the bearing device rotates faster, the lubricant will flow faster and—according to Stokes' law—will exert a higher drag force on stationary particles. Hence, in order to form agglomerates at a higher rpm the net field force exerted on each particle by the field should be higher. The same applies for a higher viscosity of the lubricant.

In an embodiment, the agglomerate is positioned against one of the first bearing surface and the second bearing surface and is stationary with respect to said one of the first bearing surface and the second bearing surface.

In an embodiment, the one or more field generators are configured to form the local flow obstruction with an obstruction height in the direction of the bearing gap, wherein said obstruction height is smaller than the bearing gap height. This allows lubricant to flow over the flow obstruction.

In an embodiment, the field strength varies in the direction of the bearing gap, wherein the field strength on one side of the bearing gap is at least 25 percent higher, preferably 50 percent, more preferably 2 times, even more preferably 5 times, yet more preferably 10 times higher than in the centre of the bearing gap.

When the field generators are magnetic field generators and particles that respond to magnetic fields are used, this spatial gradient of the magnetic field allows for a magnetic force on the particles in the direction of the bearing gap (i.e. along this gradient). This force can remove the particles from suspension to form agglomerates. The particles may comprise a permanent or inducible magnetic dipole moment.

When the field generators are electric field generators and particles that respond to electric fields are used, this spatial gradient of the field allows for particles that hold no net charge but do have a permanent or inducible electric dipole moment to be used, as well as particles that do hold a net charge.

In WO2018212657A1, a magnetorheological lubricant is used. In this document, it is explained that the rheological properties of the lubricant are controlled by the magnitude of a magnetic field. There is thus no need for a spatial gradient. In fact, a spatially homogeneous magnetic field would work for that application. In a bearing device according to the present invention, a spatially homogeneous magnetic field would not work, because the spatial gradient of the magnetic field is required in order to apply a net magnetic force to the particles.

In an embodiment, the field strength varies along the direction in which the lubricant flows during operation, wherein the field strength varies by least 25 percent, preferably 50 percent, more preferably with a factor 2, even more preferably a factor 5, yet more preferably a factor 10, in a distance equal to half the bearing gap height along the direction in which the lubricant flows during operation.

When the field generators are magnetic field generators and particles that respond to magnetic fields are used, this spatial gradient of the magnetic field allows for a magnetic force component on the particles in the direction along which the lubricant flows during operation of the bearing (i.e. along this gradient). This force can keep the particles in place against fluid drag during operation of the bearing. The particles may comprise a permanent or inducible magnetic dipole moment.

When the field generators are electric field generators and particles that respond to electric fields are used, this spatial gradient of the field provides an electric force component in the direction along which the lubricant flows during operation of the bearing (i.e. along this gradient) on particles which hold no net charge but do have a permanent or inducible electric dipole moment, as well as particles that do hold a net charge.

In an embodiment, at least one field generator is elongated in a direction parallel to the direction of relative movement between the bearing surfaces, wherein the obstruction zones of local flow obstructions associated with said at least one field generator are configured to obstruct lubricant flow out of the bearing through a bearing end. This limits leakage of lubricant from the bearing, reducing, among other things, environmental impact, cost, and bearing wear. This may also assist in maintaining a higher pressure of the lubricant between the bearing surfaces, increasing a load carrying capability of the bearing.

In an embodiment, at least one field generator is elongated in the direction perpendicular to the direction of relative movement between the bearing surfaces and to the direction perpendicular to the bearing surfaces, wherein the obstruction zones associated with said at least one field generator are configured to obstruct lubricant flow in the direction along which the first and second bearing surfaces move with respect to each other, thereby creating a local increase in pressure which increases a load carrying capacity of the bearing.

In an embodiment using magnetic fields, the lubricant comprises particles that are permanent magnetic dipoles. In an alternative embodiment, the lubricant comprises particles in which a magnetic dipole moment is inducible by an external magnetic field. The lubricant may also comprise both types of particles.

In an embodiment, the magnetic field generators are arranged on one side of the bearing gap only, wherein the obstruction zones are arranged on one side of the bearing gap only. This may be achieved by using particles of positive magnetic susceptibility and/or particles with a permanent magnetic dipole moment. Then, all particles will be attracted by the magnetic field generators.

In another alternative embodiment, the magnetic field generators are arranged on both sides of the bearing gap, wherein the obstruction zones are arranged on both sides of the bearing gap. This may be achieved by using particles of positive magnetic susceptibility and/or particles with a permanent magnetic dipole moment. Then, all particles will be attracted by the magnetic field generators.

In an embodiment using electric fields, the lubricant comprises electrically charged particles, such as large ions.

In an alternative embodiment, the lubricant comprises particles which have a permanent electric dipole moment, such as large polar molecules. In another alternative embodiment, the lubricant comprises particles in which an electric dipole moment is inducible by an external electric field, such as particles comprising electrically conductive materials such as metal. The lubricant may also comprise two or more of the three types of particles.

In an embodiment, the electric field generators are arranged on one side of the bearing gap only, wherein the obstruction zones are arranged on one side of the bearing gap only. This may be achieved by using charged particles, particles with a permanent electric dipole moment or particles wherein an electric dipole moment is inducible by an external electric field. Then, either all particles will be attracted by the electric field generators or all particles will be repelled by the electric field generators if all electric field generators hold a potential with respect to the carrier fluid of the same sign. All obstruction zones will thus be arranged on either the same side of the bearing gap as the electric field generators, or on the other side.

In an embodiment, the electric field generators are arranged on one side of the bearing gap only, wherein the obstruction zones are arranged on both sides of the bearing gap. This may be achieved by using a mixture of positively and negatively charged particles and/or electric field generators which are configured to hold potentials of opposing signs, wherein the mixture may also include particles that have a permanent electric dipole moment and/or particles wherein an electric dipole moment may be induced by an external electric field. The electric field generators attract particles comprising a permanent or inducible electric dipole. An electric field generator that attracts positively charged particles will repel negatively charged particles and vice versa.

In an embodiment, the electric field generators are arranged on both sides of the bearing gap, wherein the obstruction zones are arranged on one side of the bearing gap only. This may be achieved, for example, by using particles of either positive or negative charge, while all electric field generators on one side of the bearing gap hold a potential of the same sign and all electric field generators on the other side of the bearing gap hold a potential of the opposite sign.

In an embodiment, the electric field generators are arranged on both sides of the bearing gap, wherein the obstruction zones are arranged on both sides of the bearing gap. This may be achieved, for example, by using electric field generators which hold a potential of the same sign with respect to the carrier fluid on both sides of the bearing gap and using particles which hold a charge of the opposite sign. As an alternative, a mixture of both positively and negatively charged particles may be used in combination with electric field generators which hold potentials of opposite signs on opposite sides of the bearing gap.

In an embodiment, one or more magnetic field generators are electromagnets. Using electromagnets obviates the need for incorporating permanent magnets in the bearing device and can allow controlling the magnetic field, by controlling the current in the coils of the electromagnets.

In an embodiment, one or more magnetic field generators are permanent magnets.

In an embodiment, the magnetic field generators face the bearing gap with like magnetic poles. In an alternative embodiment, the magnetic field generators do not all face the bearing gap with like magnetic poles.

In an embodiment, multiple magnetic field generators are placed directly adjacent to each other. In an alternative embodiment, magnetic field generators are not placed directly adjacent to each other. In a further embodiment, a material of desirable magnetic properties is interposed between adjacent magnetic field generators. This material may be ferromagnetic material. Using such a material, the spatial shape of the magnetic field may be optimized.

In a further embodiment, magnetic field generators face the bearing gap with a different magnetic pole than adjacent magnetic field generators.

In an embodiment, the electric field generators are electrodes.

In an embodiment, the electric field generators face the bearing gap with like electric poles. In an alternative embodiment, the electric field generators do not all face the bearing gap with like electric poles.

In an embodiment, multiple electric field generators are placed directly adjacent to each other. In an alternative embodiment, electric field generators are not placed directly adjacent to each other. In a further embodiment, a material of desirable electric properties is interposed between adjacent electric field generators. This material may be an electrically conductive material. Alternatively, this material may be an electrically insulating material. Using such a material, the spatial shape of the electric field may be optimized.

In an embodiment, electric field generators face the bearing gap with a different electric pole than adjacent electric field generators.

In an embodiment, the field generators have a width in the direction of the relative motion of the bearing surfaces that is less than 20 times, preferably less than 10 times the bearing gap height.

In an embodiment, the field generators have a depth in the direction of the bearing gap that is less than 20 times, preferably less than 10 times the bearing gap height.

In an embodiment, the pitch of the field generators in the direction of the relative motion of the bearing surfaces is less than 20 times the bearing gap height.

In an embodiment, the field generators are configured such that the obstruction zones leave an open channel with a height that is less than 80 percent, in particular less than 40 percent, more in particular less than 20 percent of the bearing gap height. Leaving only a small open channel yields a larger pressure increase directly upstream from the obstruction zones, increasing a load bearing capacity of the bearing. However, this also increases the resistance of the bearing to relative movement of the bearing surfaces.

In a separate independent aspect, the invention relates to a method of moving two surfaces relative to one another using a bearing device, the bearing device comprising:
 a first bearing surface and a second bearing surface which face one another,
 one or more field generators which are embedded in the first or second bearing surface, wherein the field generators are magnetic field generators, wherein the method comprises the steps of:
 separating the first bearing surface and the second bearing surface by a bearing gap,
 filling the bearing gap with a lubricant comprising a carrier fluid and particles which respond to magnetic fields, wherein said particles are suspended in the carrier fluid in the absence of magnetic fields,
 moving the first bearing surface with respect to the second bearing surface, wherein the method comprises the step of generating a localized spatially varying magnetic field using the magnetic field generators to locally remove the particles from suspension by exerting a field force on the particles, thereby creating a local flow obstruction in the form of an agglomerate of previously suspended particles, wherein a thickness of the local flow obstruction in the direction of the bearing gap is a fraction of the bearing gap height in at least one obstruction zone in the bearing gap, thereby locally obstructing a flow of the lubricant through the bearing gap in the obstruction zone.

In a separate independent aspect, the invention relates to a method of moving two surfaces relative to one another using a bearing device, the bearing device comprising:
a first bearing surface and a second bearing surface which face one another,
one or more field generators which are embedded in the first or second bearing surface, wherein the field generators are electric field generators, wherein the method comprises the steps of:
separating the first bearing surface and the second bearing surface by a bearing gap,
filling the bearing gap with a lubricant comprising a carrier fluid and particles which respond to electric fields, wherein said particles are suspended in the carrier fluid in the absence of electric fields,
moving the first bearing surface with respect to the second bearing surface,
wherein the method comprises the step of generating a localized electric field using the electric field generators to locally remove the particles from suspension by exerting a field force on the particles, thereby creating a local flow obstruction in the form of an agglomerate of previously suspended particles, wherein a thickness of the local flow obstruction in the direction of the bearing gap is a fraction of the bearing gap height in at least one obstruction zone in the bearing gap, thereby locally obstructing a flow of the lubricant through the bearing gap in the obstruction zone.

In an embodiment of the method, the field generated by the field generators exerts a field force on the particles, wherein the relative movement of the first bearing surface and the second bearing surface creates a flow of the carrier fluid relative to the first bearing surface and the second bearing surface, wherein said flow of the carrier fluid exerts a drag force on the particles, wherein an effective force resulting from the field force and the drag force locally causes the particles to form an agglomerate of previously suspended particles on one of the first bearing surface and the second bearing surface, wherein said agglomerate is stationary with respect to said one of the first bearing surface and the second bearing surface.

In an embodiment of the method, the method comprises the step of using one or more field generators to form the local flow obstruction with an obstruction height in the direction of the bearing gap, wherein said obstruction height is smaller than the bearing gap height.

In an embodiment of the method, at least one obstruction zone of a local flow obstruction obstructs lubricant flow out of the bearing through a bearing end.

In an embodiment of the method, at least one obstruction zone of a local flow obstruction obstructs lubricant flow in the direction along which the first and second bearing surfaces move with respect to each other, thereby creating a local increase in pressure which increases a load carrying capacity of the bearing.

In an embodiment of the method, the method comprises the step of arranging the obstruction zones on one side of the bearing gap only.

In an embodiment of the method, the method comprises the step of arranging the obstruction zones on both sides of the bearing gap.

In an embodiment of the method, the method comprises the step of varying a composition of the lubricant fed to the bearing depending on conditions such as radial or axial bearing load, speed of relative movement of the bearing surfaces, relative position of bearing parts, bearing wear, and obstruction zone condition.

In an embodiment of the method, the method comprises the step of feeding a lubricant comprising a carrier fluid and particles suspended therein to the bearing in a first operational phase of the bearing and feeding a lubricant comprising a lubricating fluid and no suspended particles in a second operational phase of the bearing.

In an embodiment of the method, the method comprises the step of feeding a lubricant comprising a carrier fluid and particles suspended therein to the bearing in a first operational phase of the bearing and feeding a lubricant comprising a lubricating fluid different from said carrier fluid and no suspended particles in a second operational phase of the bearing.

In an embodiment of the method, the method comprises the step of periodically feeding a fluid containing particles to the bearing, wherein the lubricant fed to the bearing does not comprise suspended particles.

In an embodiment of the method, the method comprises the step of varying a composition of the lubricant supplied to the bearing depending on the lubricant supply inlet through which it is supplied.

In an embodiment of the method, the method comprises the step of varying the thickness of the local flow obstruction depending on conditions such as radial or axial bearing load, speed of relative movement of the bearing surfaces, relative position of bearing parts, and bearing wear.

In an embodiment of the method, the method comprises the step of varying a spatial gradient of the magnetic or electric field.

In an embodiment of the method, the method comprises the step of varying a size of the agglomerates by varying the spatial gradient of the magnetic or electric field.

Independent Control of Field Generators

In order to achieve further advantageous effects, the field generators of a bearing device and method as described above may be controlled independently from one another. The skilled person will recognize that the aspect of controlling the field generators independently may also be applied to magnetorheological and electrorheological bearings, as well as bearings wherein the viscosity of the lubricant is locally controlled by locally controlling the lubricant temperature or bearings wherein the slip velocity of the lubricant is locally controlled. Hence, the independent control of the field generators is an aspect which can be viewed independently from the concept of forming a local flow obstruction in the form of an agglomerate of previously suspended particles in a bearing. In this aspect, the invention relates to a bearing device having a lubricant which is controllable by activators, wherein the bearing device comprises multiple activators.

A flow in a channel can be modelled using a slip boundary condition. This slip boundary condition can vary from a zero-slip boundary condition to a perfect slip condition (see e.g. Encyclopedia of Microfluidics and Nanofluidics 2008 Edition|Editors: Dongqing Li). One of the mechanisms that can be used to describe this variation in the slip boundary condition is the apparent slip boundary condition, wherein a thin boundary region of several molecules thick adjacent to the walls experiences drag from said walls, while molecules in the bulk flow experiences drag from adjacent fluid molecules only. The molecules directly adjacent to the walls are stationary with respect to the walls. The boundary region is generally very thin in comparison with the channel thickness, such that modelling the flow can be simplified by neglecting the boundary layer thickness and modelling the bulk flow only. When this approach is chosen, the velocity gradient in the boundary layer can be accounted for by incorporating a slip velocity into the model, which is the velocity differential over the boundary layer. This slip velocity may be controlled. Another method of describing this variation in the slip boundary condition is the true slip boundary condition, wherein the fluid molecules directly adjacent to the surface actually slide on the surface with a velocity differential equal to the slip velocity.

An example how the slip velocity may be controlled is in a bearing device with a hydrophobic bearing surface wherein the lubricant comprises bipolar molecules or particles comprising a hydrophobic side and a hydrophilic side. When an external field is applied to orient the molecules or particles such that the hydrophobic side is oriented towards the bearing surface, the molecules or particles tend to stick to the bearing surface. This increases the flow resistance near the bearing surface, decreasing the slip velocity. When instead an opposite external field is applied, the molecules or particles are oriented such that the hydrophilic side is oriented towards the bearing surface. The molecules or particles are then repulsed by the bearing surface, decreasing flow resistance near the bearing surface. This increases the slip velocity. Instead of hydrophobic, the bearing surface may also by hydrophilic. Combinations of hydrophobic and hydrophilic areas of bearing surfaces are also possible.

The field may be an electric field or a magnetic field. Instead of or in addition to being oriented, the molecules or particles may also be drawn to or repulsed from the bearing surface by a field force.

Therefore, the present invention further relates to a bearing device comprising:
a first bearing surface and a second bearing surface which are moveable relative to one another and which face one another, wherein the first bearing surface and second bearing surface are separated by a bearing gap filled with a lubricant,
multiple activators embedded in the first or second bearing surface, wherein:
the lubricant is a magnetorheological liquid and the activators are magnetic field generators configured to locally increase the viscosity of the lubricant in at least one obstruction zone in the bearing gap, thereby locally obstructing a flow of the lubricant through the bearing gap in said at least one obstruction zone, or
the lubricant is an electrorheological liquid and the activators are electric field generators configured to locally increase the viscosity of the lubricant in at least one obstruction zone in the bearing gap, thereby locally obstructing a flow of the lubricant through the bearing gap in said at least one obstruction zone, or
the lubricant has a temperature dependent viscosity and the activators are heating and/or cooling elements configured to locally heat and/or cool the lubricant to locally increase the viscosity of the lubricant in at least one obstruction zone in the bearing gap, thereby locally obstructing a flow of the lubricant through the bearing gap in said at least one obstruction zone, or
the lubricant has a controllable slip velocity and the activators are configured to locally control the slip velocity of the lubricant, or
the lubricant comprises a carrier fluid and particles which respond to magnetic fields, wherein said particles are suspended in the carrier fluid in the absence of magnetic fields, wherein the activators are magnetic field generators configured to generate a localized spatially varying magnetic field which is configured to locally remove the particles from suspension by exerting a field force on the particles, thereby forming a local flow obstruction on at least one of the bearing surfaces in the form of an agglomerate of previously suspended particles, wherein the local flow obstruction is configured to locally obstruct a flow of the lubricant through the bearing gap in an obstruction zone, or
the lubricant comprises a carrier fluid and particles which respond to electric fields, wherein said particles are suspended in the carrier fluid in the absence of electric fields, wherein the activators are electric field generators configured to generate a localized electric field which is configured to locally remove the particles from suspension by exerting a field force on the particles, thereby forming a local flow obstruction on at least one of the bearing surfaces in the form of an agglomerate of previously suspended particles, wherein the local flow obstruction is configured to locally obstruct a flow of the lubricant through the bearing gap in an obstruction zone,
wherein at least one activator is controllable independently from at least one other activator.

In an embodiment, the activators are controllable to form multiple different patterns of activated activators on a bearing surface, wherein the multiple different patterns comprise a first pattern having a first shape and a second pattern having a second shape which is different from the first shape.

In an embodiment, the activators are divided in multiple activator groups, wherein the activator groups comprise at least a first activator group and a second activator group, wherein the activators of an activator group are controllable independently from activators of another activator group, wherein activators of the first activator group are controllable to form the first pattern of activated activators and wherein the activators of the second activator group are controllable to form the second pattern of activated activators.

In an embodiment, the first shape is elongated in a direction parallel to the direction of relative movement between the bearing surfaces, wherein at least one first obstruction zone of the activators of the first activator group is configured to obstruct lubricant flow out of the bearing through a bearing end.

In an embodiment, the second shape is elongated in a direction perpendicular to the direction of relative movement between the bearing surfaces and to the direction perpendicular to the bearing surfaces, wherein at least one second obstruction zone of the activators of the second activator group is configured to obstruct lubricant flow in the direction along which the first and second bearing surfaces move with respect to each other, thereby creating a local increase in pressure which increases a load carrying capacity of the bearing.

In an embodiment, the first shape defines a top being directed in a first shape direction, wherein the obstruction zone associated with the activators of the first activator group is configured to cause, when the first and second bearing surfaces move relative to one another such that the lubricant flows through the obstruction zone in de first shape direction, a local rise of a pressure of the lubricant within the bearing gap in the non-obstruction zone which is located upstream of each obstruction zone and in particular in a peak zone which is located directly upstream of each top, wherein the second shape defines a top being directed in a second shape direction, wherein the obstruction zone associated with the activators of the second activator group is configured to cause, when the first and second bearing surfaces move relative to one another such that the lubricant flows through the obstruction zone in de second shape direction, a local rise of a pressure of the lubricant within the bearing gap in the non-obstruction zone which is located upstream of each obstruction zone and in particular in a peak zone which is located directly upstream of each top.

In an embodiment, each obstruction zone comprises a left section and a right section, wherein the left and right section direct the lubricant towards the peak zone.

In an embodiment, the first shape comprises one or more first arrow heads pointing in a first shape direction, wherein the second shape comprises one or more second arrow heads pointing in a second shape direction, wherein the second shape direction is an opposite direction of the first shape direction.

In an embodiment, each of the activators is individually controllable.

In an embodiment, the bearing device comprises a controller to control the activators, wherein the controller is configured to create at least two different configurations of activated field generators.

Independent control of the activators or field generators may be used to account for varying conditions such as bearing load, bearing wear condition, bearing speed, bearing movement direction, and bearing gap thickness. Bearing load may be measured by a load sensor connected to the controller, wherein the control unit takes the signal from the load sensor into account when controlling the activators or field generators. Bearing speed may be measured by a bearing speed sensor connected to the controller. The bearing movement direction may be measured by a bearing movement direction sensor connected to the controller. Bearing gap thickness may be measured by one or more gap sensors connected to the controller. Bearing wear condition may be estimated using rotation counter connected to the controller and/or a bearing load sensor connected to the controller and/or a bearing speed sensor connected to the controller, wherein a wear condition of the bearing is determined based on the historical data of the load sensor and/or the rotation counter and/or the bearing speed sensor.

For example, in a bearing comprising a load sensor, the controller may control the activators or field generators to provide low resistance of the bearing in a low load scenario, while the controller may control the activators or field generators to provide a high load bearing capacity in a high load scenario.

In a bearing comprising a gap sensor, the controller may control the activators or field generators to keep the bearing gap height at a predetermined value. Using gap sensors at various locations around a rotational bearing, the controller may control the activators or field generators to keep an inner bearing component centered in an outer bearing component.

In a bearing comprising a bearing movement direction sensor, the controller may control the activators or field generators to provide an optimized pattern of activated activators or field generators for the measured bearing movement direction.

In a bearing comprising a bearing wear condition sensor, the controller may control the activators or field generators to provide an optimized pattern of activated activators or field generators for the measured wear condition.

The activators or field generators may also be activated and deactivated by other inputs, for example by a user or another device selecting a low-resistance program, a low-wear program, a low-leakage program or a high-load program.

The skilled person will recognize that the features of any embodiment of the bearing device wherein at least one activator is controllable independently from at least one other activator may be combined with the features of any embodiment of the bearing device wherein the field generators are magnetic field generators configured to generate a localized spatially varying magnetic field and with any embodiment of the bearing device wherein the field generators are electric field generators configured to generate a localized electric field.

In a separate independent aspect, the invention relates to a method of moving two surfaces relative to one another using a bearing device, the bearing device comprising:
   a first bearing surface and a second bearing surface which face one another,
   multiple activators embedded in the first or second bearing surface, wherein the method comprises the steps of:
   separating the first bearing surface and the second bearing surface by a bearing gap,
   moving the first bearing surface with respect to the second bearing surface,
   filling the bearing gap with a lubricant, wherein:
      the lubricant is a magnetorheological liquid and the activators are magnetic field generators configured to locally increase the viscosity of the lubricant in at least one obstruction zone in the bearing gap, thereby locally obstructing a flow of the lubricant through the bearing gap in said at least one obstruction zone, or
      the lubricant is an electrorheological liquid and the activators are electric field generators configured to locally increase the viscosity of the lubricant in at least one obstruction zone in the bearing gap, thereby locally obstructing a flow of the lubricant through the bearing gap in said at least one obstruction zone, or
      the lubricant has a temperature dependent viscosity and the activators are heating and/or cooling elements configured to locally heat and/or cool the lubricant in order to locally increase the viscosity of the lubricant in at least one obstruction zone in the bearing gap, thereby locally obstructing a flow of the lubricant through the bearing gap in said at least one obstruction zone, or
      the lubricant has a controllable slip velocity and the activators are configured to locally control the slip velocity of the lubricant, or
      the lubricant comprises a carrier fluid and particles which respond to magnetic fields, wherein said particles are suspended in the carrier fluid in the absence of magnetic fields, wherein the activators are magnetic field generators configured to generate a localized spatially varying magnetic field which is configured to locally remove the particles from suspension by exerting a field force on the particles, thereby forming a local flow obstruction on at least one of the bearing surfaces in the form of an agglomerate of previously suspended particles, wherein the local flow obstruction is configured to locally obstruct a flow of the lubricant through the bearing gap in an obstruction zone, or the lubricant comprises a carrier fluid and particles which respond to electric fields, wherein said particles are suspended in the carrier fluid in the absence of electric fields, wherein the activators are electric field generators configured to generate a localized electric field which is configured to locally remove the particles from suspension by exerting a field force on the particles, thereby forming a local flow obstruction on at least one of the bearing surfaces in the form of an agglomerate of previously suspended particles, wherein the local flow obstruction is configured to locally obstruct a flow of the lubricant through the bearing gap in an obstruction zone, controlling at least one activator independently from at least one other activator.

In an embodiment, the method comprises the step of controlling the activators to form multiple different patterns of activated activators on a bearing surface, wherein the multiple different patterns comprise a first pattern having a first shape and a second pattern having a second shape which is different from the first shape.

In an embodiment, the method comprises the steps of:
dividing activators in multiple activator groups, wherein the activator groups comprise at least a first activator group and a second activator group, wherein the activators of an activator group are controlled independently from activators of another activator group,
controlling the activators of the first activator group to form the first pattern of activated activators and controlling the activators of the second activator group to form the second pattern of activated activators.

In an embodiment, the first shape is elongated in a direction parallel to the direction of relative movement between the bearing surfaces, wherein at least one first obstruction zone of the activators of the first activator group obstructs lubricant flow out of the bearing through a bearing end.

In an embodiment, the second shape is elongated in a direction perpendicular to the direction of relative movement between the bearing surfaces and to the direction perpendicular to the bearing surfaces, wherein at least one second obstruction zone of the activators of the second activator group obstructs lubricant flow in the direction along which the first and second bearing surfaces move with respect to each other, thereby creating a local increase in pressure which increases a load carrying capacity of the bearing.

In an embodiment, the first shape defines a top being directed in a first shape direction, wherein the obstruction zone associated with the activators of the first activator group causes, when the first and second bearing surfaces move relative to one another such that the lubricant flows through the obstruction zone in de first shape direction, a local rise of a pressure of the lubricant within the bearing gap in the non-obstruction zone which is located upstream of each obstruction zone and in particular in a peak zone which is located directly upstream of each top, wherein the second shape defines a top being directed in a second shape direction, wherein the obstruction zone associated with the activators of the second activator group is causes, when the first and second bearing surfaces move relative to one another such that the lubricant flows through the obstruction zone in de second shape direction, a local rise of a pressure of the lubricant within the bearing gap in the non-obstruction zone which is located upstream of each obstruction zone and in particular in a peak zone which is located directly upstream of each top.

In an embodiment, each obstruction zone comprises a left section and a right section, wherein the left and right section direct the lubricant towards the peak zone.

In an embodiment, the first shape comprises one or more first arrow heads pointing in a first shape direction, wherein the second shape comprises one or more second arrow heads pointing in a second shape direction, wherein the second shape direction is an opposite direction of the first shape direction.

In an embodiment, the method comprises the step of individually controlling each of the activators.

In an embodiment, the method comprises the step of controlling the activators using a controller.

The skilled person will recognize that the features of any embodiment of the method wherein at least one activator is controlled independently from at least one other activator can be combined with the features of any of the embodiments of the method wherein a localized spatially varying magnetic field is generated or the method wherein a localized electric field is generated Above, embodiments using either a magnetic field or an electric field are described. It will be clear to the skilled person that a bearing device using both electric and magnetic fields and consequently uses both particles that respond to electric fields and particles that respond to magnetic fields is also possible. Using particles that respond to both magnetic and electric fields is also possible. Such embodiments also fall within the scope of this disclosure.

Combinations with a magnetorheological liquid or an electrorheological liquid, a lubricant having a temperature dependent viscosity, or a lubricant having a controllable slip velocity also fall within the scope of this disclosure.

These and other aspects of the invention will be more readily appreciated as the same becomes better understood by reference to the following detailed description and considered in connection with the accompanying drawings in which like reference symbols designate like parts.

SHORT DESCRIPTION OF THE FIGURES

FIGS. 1A-D show schematic depictions of the behaviour of the lubricant comprising a carrier fluid and particles in a bearing comprising magnetic field generators.

DETAILED DESCRIPTION OF THE FIGURES

Figure 1A:
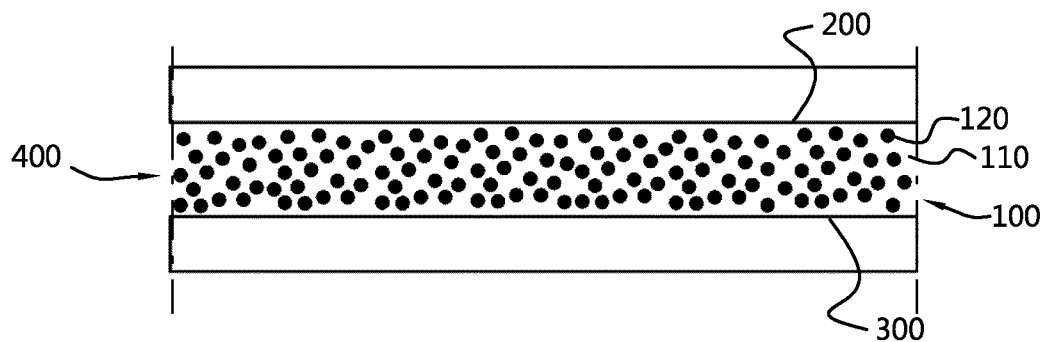

FIGS. 1A-D show a schematic depiction of a working principle of the self-healing bearing 10. The bearing comprises two bearing surfaces 200, 300 which are movable with respect to each other and which face one another. A lubricant 100 comprising a carrier fluid 110 and particles 120 suspended therein is disposed between the bearing surfaces 200, 300 in a bearing gap 400 with a bearing gap height 420. The bearing gap centre 410 is the area midway between the bearing surfaces 200, 300, i.e. the area that is equidistant from both bearing surfaces 200, 300.

At least one of the bearing surfaces comprises field generators 500 which generate an electric or magnetic field or are configurable to generate an electric or magnetic field. The field generators 500 may or may not be placed directly adjacent to each other. Preferably, the pitch 503 of the field generators in the direction of relative motion of the bearing surfaces 200, 300 is less than 20 times the bearing gap height 420. FIGS. 1A-D depict an embodiment where the field generators 500 are not placed directly adjacent to each other. The magnetic or electric fields can locally remove the particles 120 from suspension in the lubricant 100, forming agglomerates 121 on a bearing surface. These agglomerates 121 can form flow obstructions 122.

When lubricant flows past a flow obstruction 122, a pressure increase is created directly upstream from the flow obstruction 122. This may increase a load carrying capacity of the bearing 10 by preventing contact between the bearing surfaces 200, 300 when a load perpendicular to the bearing surfaces 200, 300 is applied to the bearing 10. Additionally or alternatively, the flow obstructions 122 may be positioned along the bearing ends, such that lubricant flow out of the bearing is inhibited. This decreases leakage of lubricant 100 and can assist in maintaining a higher pressure of the lubricant 100 inside the bearing 10, increasing a load carrying capacity of the bearing.

FIG. 1A shows a situation where the bearing surfaces 200, 300 are stationary with respect to each other in the absence of an electric or magnetic field. The particles 120 are homogeneously distributed in the lubricant 100.

Figure 1B:
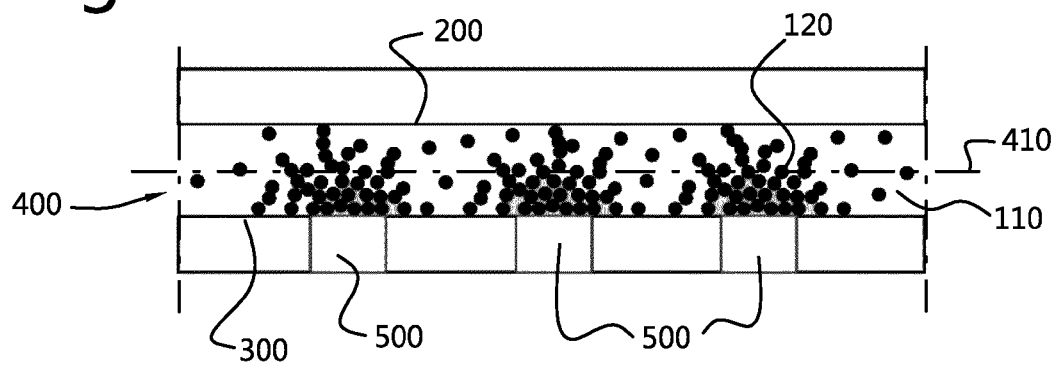

FIG. 1B shows a situation where the bearing surfaces 200, 300 are stationary with respect to each other in the presence of an electric or magnetic field, generated by the field generators 500. The particles 120 are attracted by the field generators and cluster around them, breaking the homogeneity of their distribution in the lubricant 100.

Figure 1C:
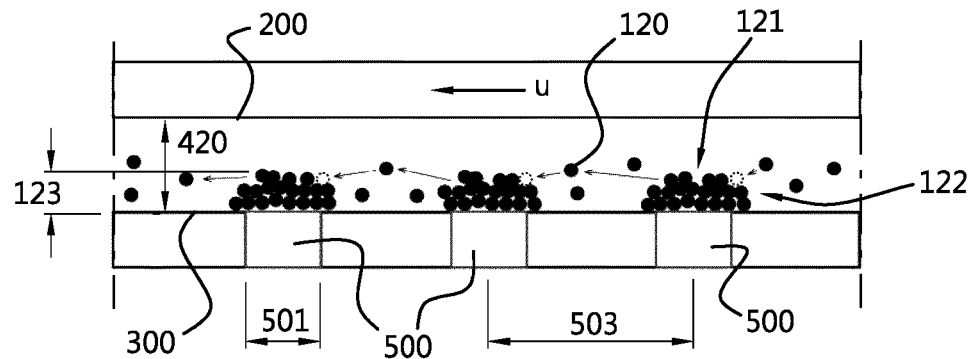

FIG. 1C shows a situation where the first bearing surface 200 moves with a speed u to the left with respect to the second bearing surface 300 in the presence of an electric or magnetic field, generated by the field generators 500. The relative movement of the bearing surfaces and the no-slip boundary condition at the bearing surfaces gives rise to a velocity distribution in the lubricant 100 wherein the velocity varies over the bearing gap. The lubricant 100 will flow from right to left. The particles 120 experience a field force 800 attracting them towards the field generators 500, as well as a drag force 810 resulting from the lubricant flow. The interplay between these forces yields an effective force 820, resulting in the behaviour shown in FIG. 1C, where localized agglomerates 121 of particles 120 are formed on one of the bearing surfaces 200, 300 which form flow obstructions 122 in obstruction zones. The effective force 820 is countered by a reaction force 830 exerted on the particle by the bearing surfaces 200, 300 and other particles 120. The sum of the effective force 820 and the reaction force 830 exerted on the particle 120 is zero, such that the particle remains stationary within the agglomerate 121. If this balance is broken, for example by a colliding particle 120 or another perturbation, the particle 120 will leave the agglomerate 121. This particle 120 may then be entrained by the lubricant stream and may collide with and/or join another agglomerate 121, such that a self-healing effect of the agglomerates 121 is achieved.

The field force 800 exerted on the particles 120 by the field must be above a certain threshold value in order to hold the particles 120 in place against the drag force 810 of the flowing lubricant 100. It will be understood that this threshold value of the field force 800 is dependent on at least the rpm of the bearing device 10 and the viscosity of the lubricant 100. If the bearing device 10 rotates faster, the lubricant 100 will flow faster and—according to Stokes' law—will exert a higher drag force 810 on stationary particles 120. Hence, in order to form agglomerates 121 at a higher rpm the field force 800 exerted on each particle 810 by the field should be higher. The same applies for a higher viscosity of the lubricant 100.

Figure 1D:
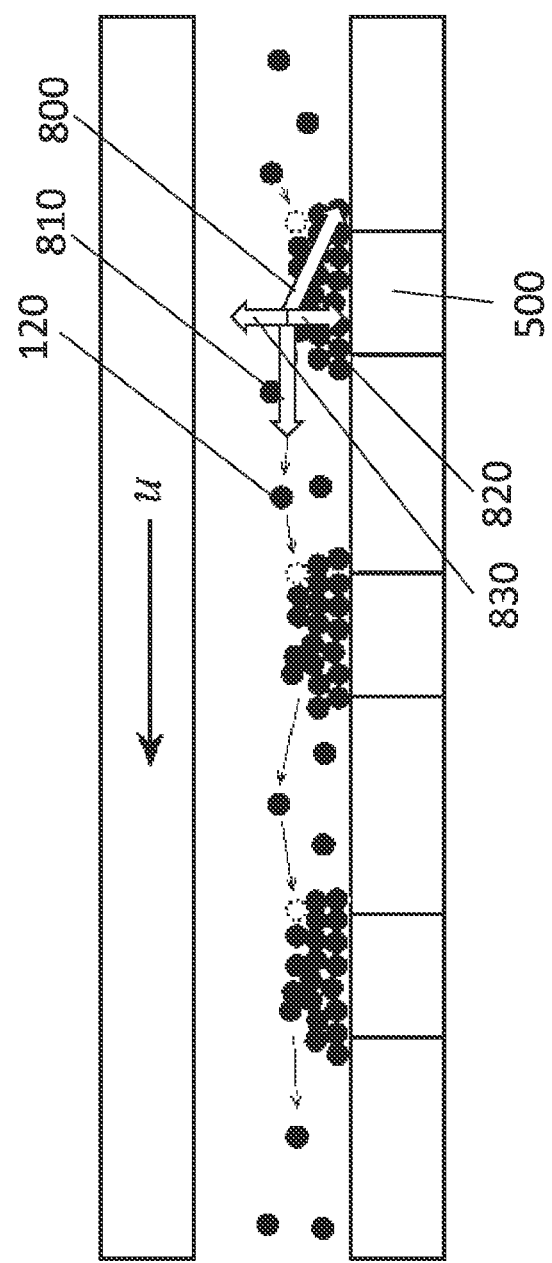

The agglomerates 121 are stationary with respect to the bearing surface on which they are formed. Particles 120 are continuously supplied to and removed from the agglomerates 121 by the lubricant flow FIG. 1D shows an enlarged view of FIG. 1C, further indicating the field force 800, the drag force 810 and the effective force 820.

The agglomerates 121 create flow obstructions 122 which have an obstruction height 123 that is a fraction of the height 420 of the bearing gap 400, allowing the lubricant 100 to flow over the flow obstructions 122. For a given relative velocity of the bearing surfaces 200, 300 and a given bearing gap height 420, a larger obstruction height 123 induces a larger pressure differential over the obstruction in the direction of lubricant flow and a larger velocity of the lubricant 100 passing over the obstruction 122. This, in turn, causes a larger drag force on the particles 120 making up the obstruction 122, such that growing the obstruction height 123 even further requires an even larger field force 800 to counter the increased drag force 810. On the other hand, for a given bearing gap height 420, a larger relative velocity of the bearing surfaces 200, 300 leads to a larger velocity of the lubricant 100 passing over the obstruction 122. This, in turn, causes a larger drag force on the particles 120 making up the obstruction 122, which results in a lower obstruction height 123. Seeing that the flow of lubricant 100 between the bearing surfaces 200, 300 depends on the relative velocity of the bearing surfaces 200, 300 and the distance between these bearing surfaces (the bearing gap height 420), this mechanism may lead to an equilibrium height 123 of the flow obstructions 122 that depends on the relative velocity of the bearing surfaces 200, 300 and the bearing gap height 420.

The field force 800 may be varied in order to vary the size of the agglomerates. In order to achieve this, the spatial gradient of the magnetic or electric field may be varied. In case of an electric field, the electric field strength may be varied as well when electrically charged particles are used. By varying the size of the agglomerates, the bearing device can be adjusted to different scenarios and/or user demands, such as low resistance, high load bearing capacity, and/or low leakage of lubricant out of the bearing.

The flow obstructions 122 may leave an open channel through the bearing gap 400 that is less than 80% of the bearing gap height. This channel may also be smaller with respect to the bearing gap height, while the height of this channel may depend on the operating conditions of the bearing. The pressure increase directly upstream of a flow obstruction 122 results in an increased capability of the bearing 10 to carry loads transferred between the bearing surfaces 200, 300.

The concentration of particles 120 in the lubricant 100 fed to the bearing 10 may be varied, with the goal of controlling the flow obstruction height 123. Generally, lower particle concentrations are required than in magnetorheological or electrorheological bearing devices. This is due to the fact that the particles are only needed to form the agglomerates, rather than being dispersed throughout the entire volume of the lubricant. The flow obstruction height 123 may be varied depending on conditions such as radial or axial bearing load, speed of relative movement of the bearing surfaces, relative position of bearing parts, and bearing wear. For example, a lubricant 100 with a high concentration of particles 120 may be fed to the bearing 10 in an initial stage, while a lubricant 100 with a lower or even zero concentration of particles 120 is fed to the bearing 10 once the flow obstructions 122 have been established within the bearing 10. A lubricant 100 with a high concentration of particles 120 may also be fed to the bearing 10 periodically or incidentally, while a lubricant 100 without or substantially without particles 120 is fed to the bearing 10 in between these moments of particle feeding. The time between these moments and the number of particles 120 fed to the bearing 10 during these moments may for example depend on measurements of the bearing 10, such as bearing load, relative speed of the bearing surfaces, bearing gap height 420, a predetermined schedule based on operation hours of the bearing, or a combination of these factors.

The carrier fluid 110 itself may also be varied, for example to a fluid that cannot hold as many particles 120 in suspension but has better lubricating properties. Particle concentration and carrier fluid type may also be controlled based on the operating conditions of the bearing 10, such as bearing load, relative movement speed of the bearing surfaces 200, 300, relative position of bearing parts, bearing gap height 420, bearing wear, and obstruction zone condition. This way, the obstruction height 123 can be adapted to the operating conditions of the bearing, to minimize bearing resistance under low load scenarios and minimize bearing wear under high load scenarios.

The field generators 500 may be magnetic field generators 510 or electric field generators 520, or a combination of both, while the particles 120 respond to these fields. The skilled person will understand that in case of magnetic field generators the field force will be a magnetic force and in case of electric field generators the field force will be an electric force.

Because magnetic monopoles do not exist while electric monopoles do, and because dipoles experience no net field force in a spatially homogeneous field, magnetic field generators 510 are configured such that a spatially varying magnetic field is generated within the bearing gap 400, while electric field generators 520 may be configured to create either a spatially homogeneous electric field or a spatially varying electric field within the bearing gap 400. The particles 120 may for example have a permanent magnetic or electric dipole moment or a magnetic or electric dipole may be inducible by an external field. The particles 120 may also hold an electric charge. In the case of magnetisable particles 120, wherein a magnetic dipole moment is inducible, the particles 120 may have a positive magnetic susceptibility. A combination of the particles 120 as described above is also possible.

Preferably, the magnetic field strength varies in the direction of the bearing gap, wherein the magnetic field strength on one side of the bearing gap is at least 25 percent higher, preferably 50 percent, more preferably 2 times, even more preferably 5 times, yet more preferably 10 times higher than in the centre 410 of the bearing gap. This variation provides a resultant magnetic force on the magnetic particles 120 in the direction of the bearing gap, to locally pull the particles from suspension. The electric field strength may vary in a similar way. While this is required for electrically neutral particles, it may also be desirable for electrically charged particles. A reason for this desirability is that such a variance entails that charged particles experience a larger electric force near a bearing surface. This means that the agglomerates 121 formed by those particles are held together more strongly near the bearing edge than they are more towards the bearing gap centre 410. This can lead to a favourable relationship between the equilibrium height 123 of the flow obstruction and the relative velocity of the bearing surfaces 200, 300 and the bearing gap height.

Preferably, the magnetic field strength also varies in the direction along which the lubricant flows in operation of the bearing, wherein the magnetic field strength varies by least 25 percent, preferably 50 percent, more preferably with a factor 2, even more preferably a factor 5, yet more preferably a factor 10, in a distance equal to half the bearing gap height 420 along the direction in which the lubricant flows during operation. This variation provides magnetic particles with a force component parallel to the direction of fluid flow. This force component may be used to counter the effects from fluid drag. The electric field may vary in a similar way. When electrically neutral particles, or particles with both a net charge and a dipole moment (either permanent or inducible), are used, this is sufficient to apply a force component to the particle in the direction along which the lubricant 100 flows during operation of the bearing 10. For particles without a dipole moment (either permanent or inducible), however, the electric field itself must also have a component in the direction along which the lubricant 100 flows during operation of the bearing 10 in order to exert an electric force component in this direction.

Figure 2A:
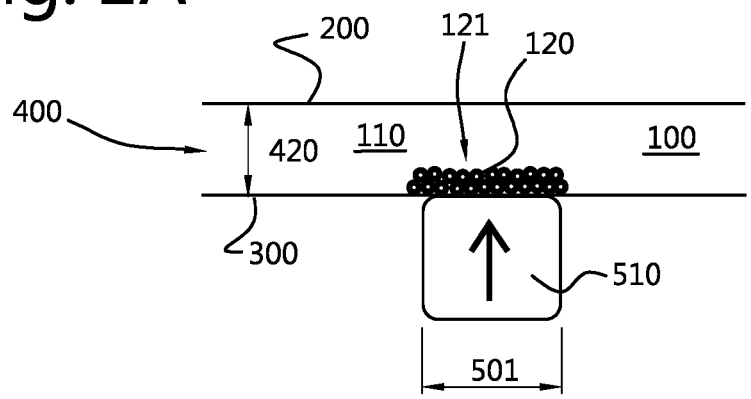
FIGS. 2A-2L show schematic depictions of a side view of the layout of magnetic field generators and the formed agglomerate for various embodiments according to the invention.
Figure 2B:
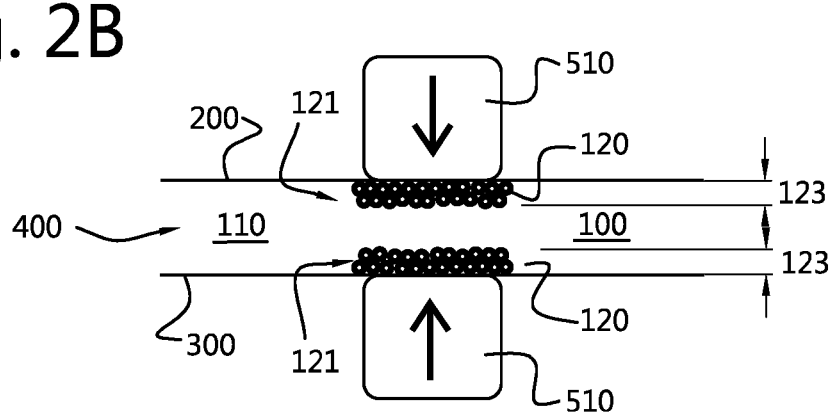
Figure 2C:
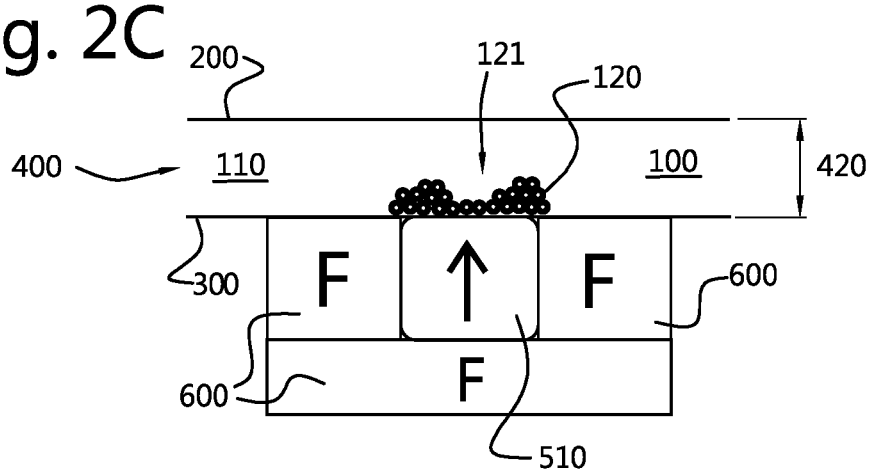
Figure 2D:
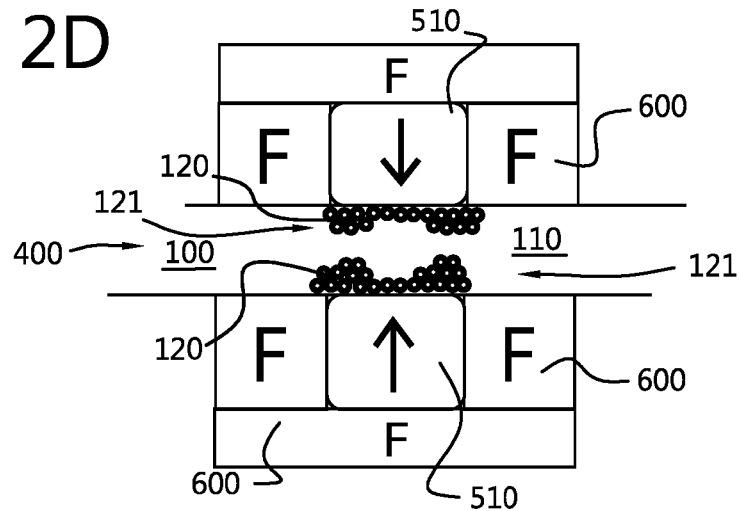
Figure 2E:
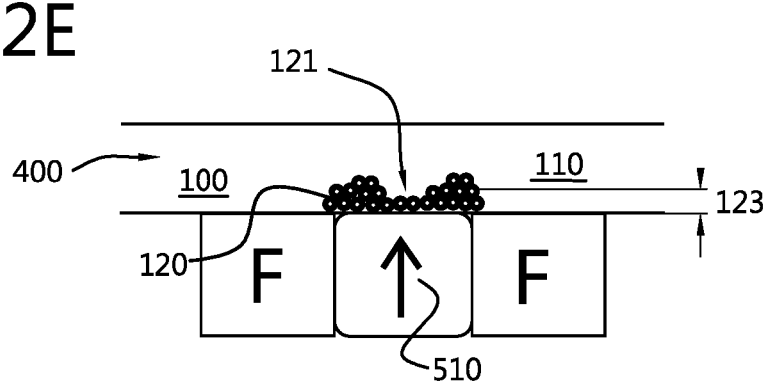
Figure 2F:
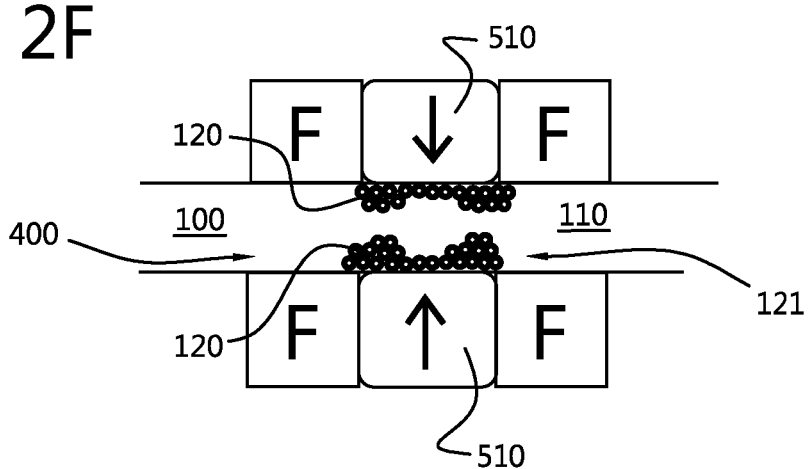
Figure 2G:
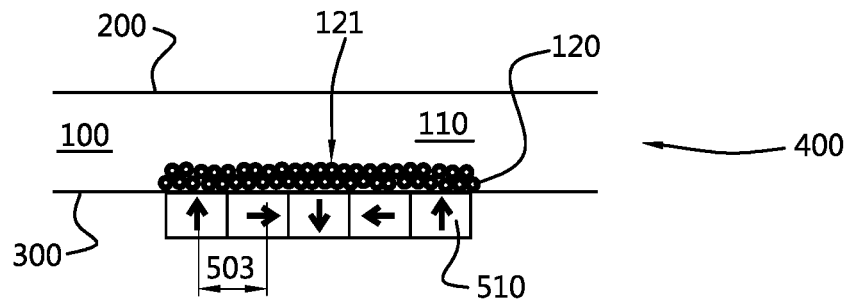
Figure 2H:
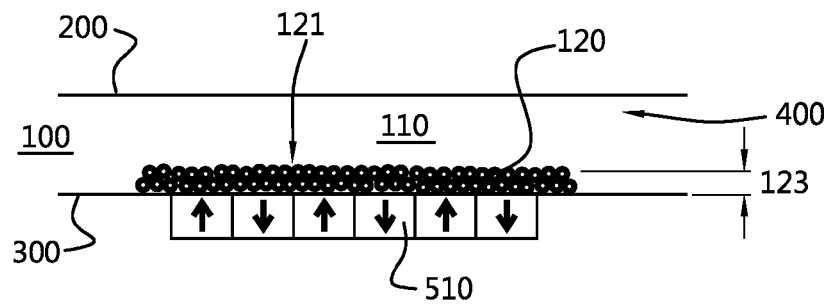
Figure 2I:
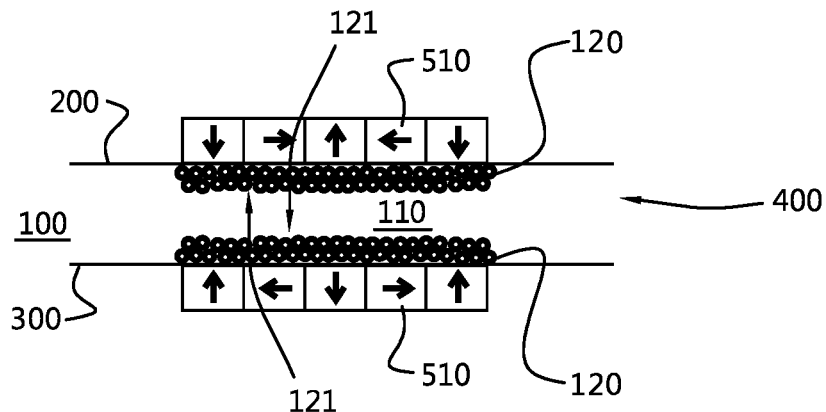
Figure 2J:
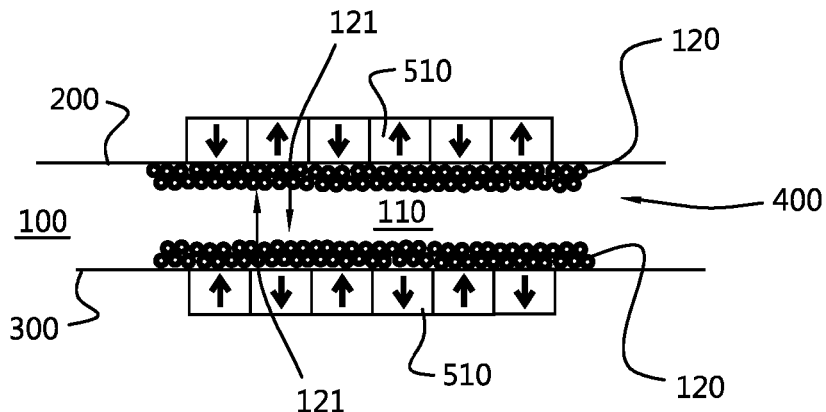

FIGS. 2A-2L show schematic depictions of a side view of the layouts of magnetic field generators 510 embedded within a section of a bearing surface of various embodiments according to the invention. The magnetic field generators 510 are positioned on one side of the bearing gap 400, creating obstruction zones on one side of the bearing gap only in FIGS. 2A, 2C, 2E, 2G, 2H, and 2K, while the magnetic field generators 510 are positioned on both sides in FIGS. 2B, 2D, 2F, 2I, 2J, and 2L. For embodiments using electric field generators 520 instead of magnetic field generators 510, similar layouts as depicted in FIGS. 2A-2L may be used for the electric field generators 520. In FIGS. 2A-2C, the magnetic field generators 510 have a length 501 along the direction of relative motion of the bearing surfaces 200, 300 that is less than 10 times the bearing gap height 420. This length 501 may also be larger, but preferably less than 20 times the bearing gap height 420. The magnetic field generators 510 in FIGS. 2A-2C have a depth 503 along the direction the bearing gap 400 that is less than 10 times the bearing gap height 420. This depth 503 may also be larger, but preferably less than 20 times the bearing gap height 420.

In FIGS. 2C, 2D, 2E, 2F, 2K, and 2L, ferromagnetic material 600 is positioned around the magnetic field generators 510 to control the shape of the magnetic field. The magnetic field generators may be permanent magnets or electromagnets. Since ferromagnetic material has a higher magnetic permeability than most materials, placing a ferromagnetic material 600 near a magnetic field generator 510 yields a smaller magnetic field and a high spatial gradient of the magnetic field near the magnetic field generator 510 but outside the ferromagnetic material 600. When electric field generators are used, a material of favourable electric properties may be positioned in between field electric generators 520 to sort a similar effect. Favourable magnetic properties may be a high or a low magnetic permeability. Similarly, favourable electric properties may be a high or a low electric permittivity. Including these materials may allow for an optimal shape of the magnetic or electric field, respectively. The magnitude of the local spatial gradient, for example, may be maximized by incorporating such materials. The direction of the gradient may be controlled as well.

Figure 2K:
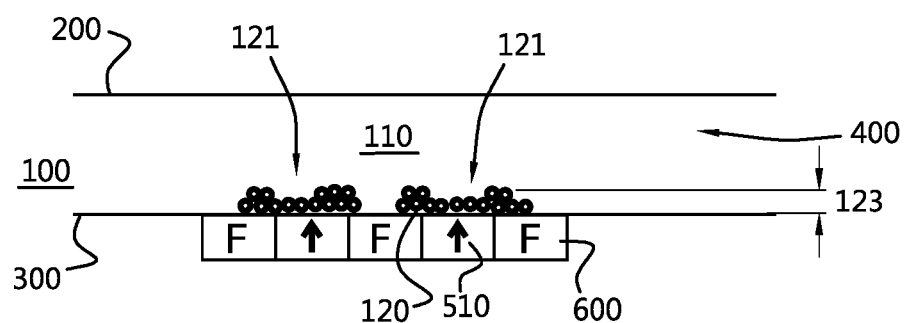
Figure 2L:
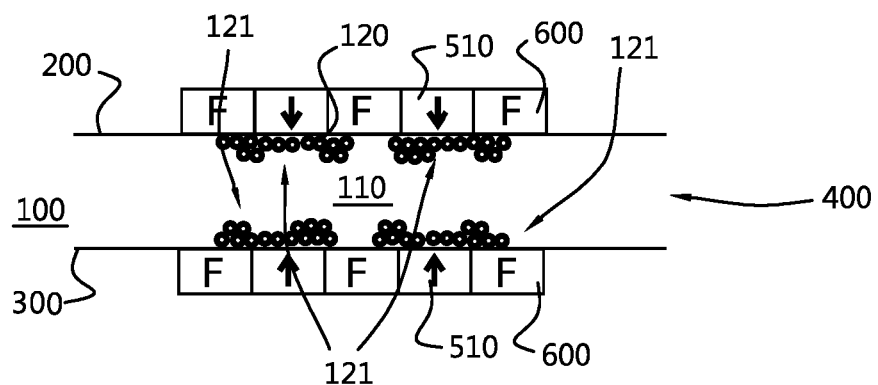

The arrows within the magnetic field generators 510 indicate the polarisation of the magnetic field generators 510. FIGS. 2K and 2L show embodiments wherein the magnetic field generators 510 all face the bearing gap 400 with like magnetic poles, while FIGS. 2A-2J show embodiments wherein the magnetic field generators 510 do not all face the bearing gap 400 with like magnetic poles. In the embodiments shown, the particles 120 are attracted towards the magnetic field generators 510. These particles may be permanent magnetic dipoles or material with a positive magnetic susceptibility.

Figure 3A:
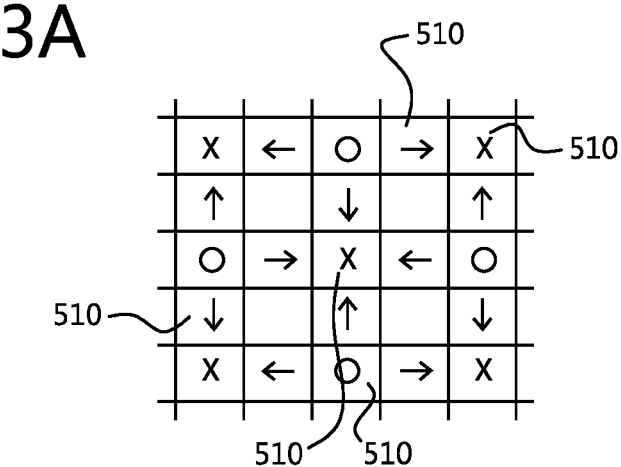
FIGS. 3A-3C show schematic depictions of the layout of magnetic field generators along a bearing surface and the formed sediment for various embodiments according to the invention.
Figure 3B:
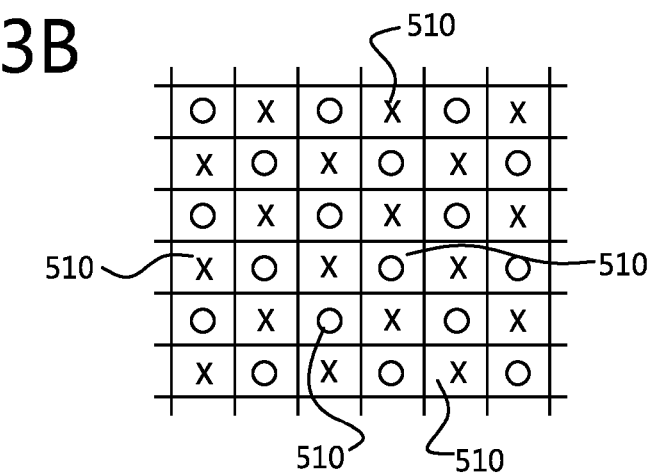
Figure 3C:
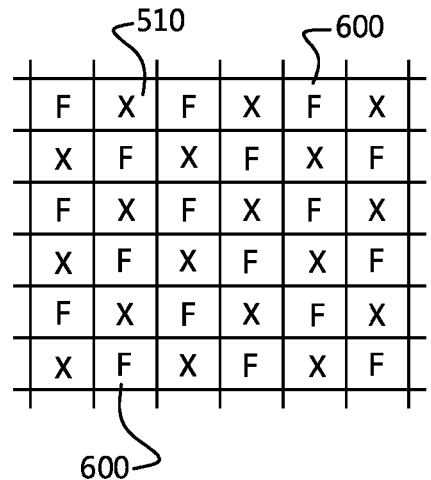

FIGS. 3A-3C show schematic depiction of the layout of magnetic field generators 510 embedded within a section of a bearing surface of various embodiments according to the invention. A circle within a magnetic field generator 510 indicates that the magnetic polarization vector points out of the plane of the figure, while a cross within a magnetic field generator 510 indicates that the magnetic polarization vector points into the plane of the figure. A layout wherein adjacent magnetic field generators 510 are of unequal or even opposite magnetic polarization yields a large spatial gradient of the magnetic field near the magnetic field generators 510, due to the close proximity of magnetic field generators which have a magnetization vector in an unequal direction.

Figure 4A:
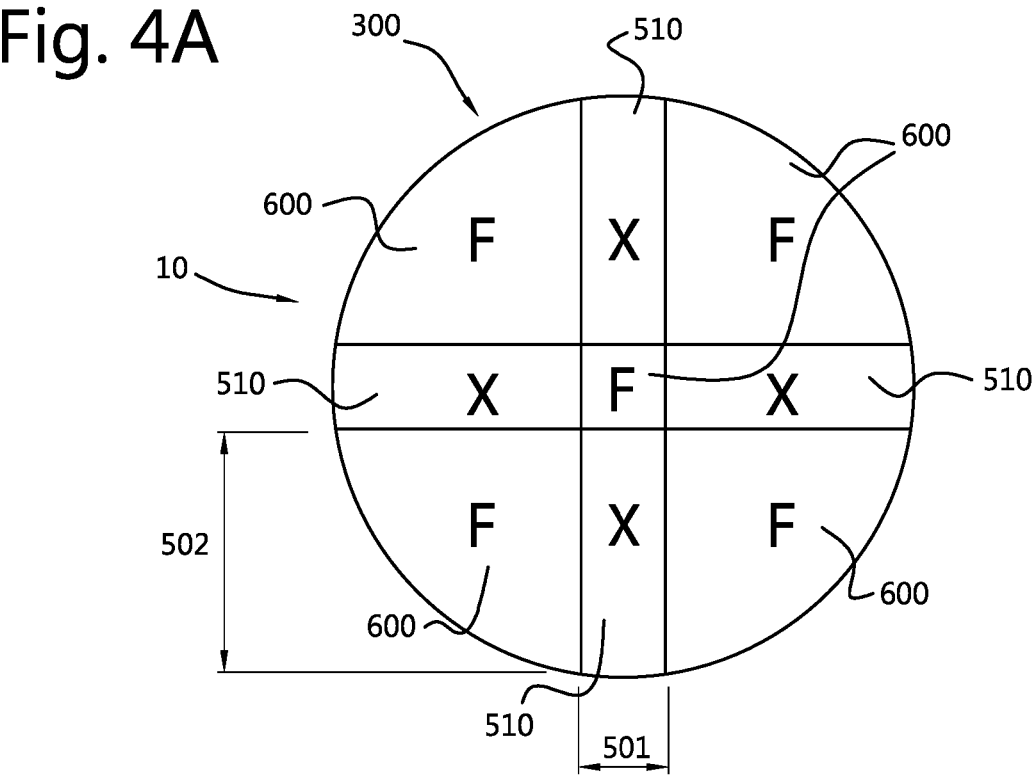
FIGS. 4A, 4B show a top view of a bearing surface of an embodiment according to the invention.
Figure 4B:
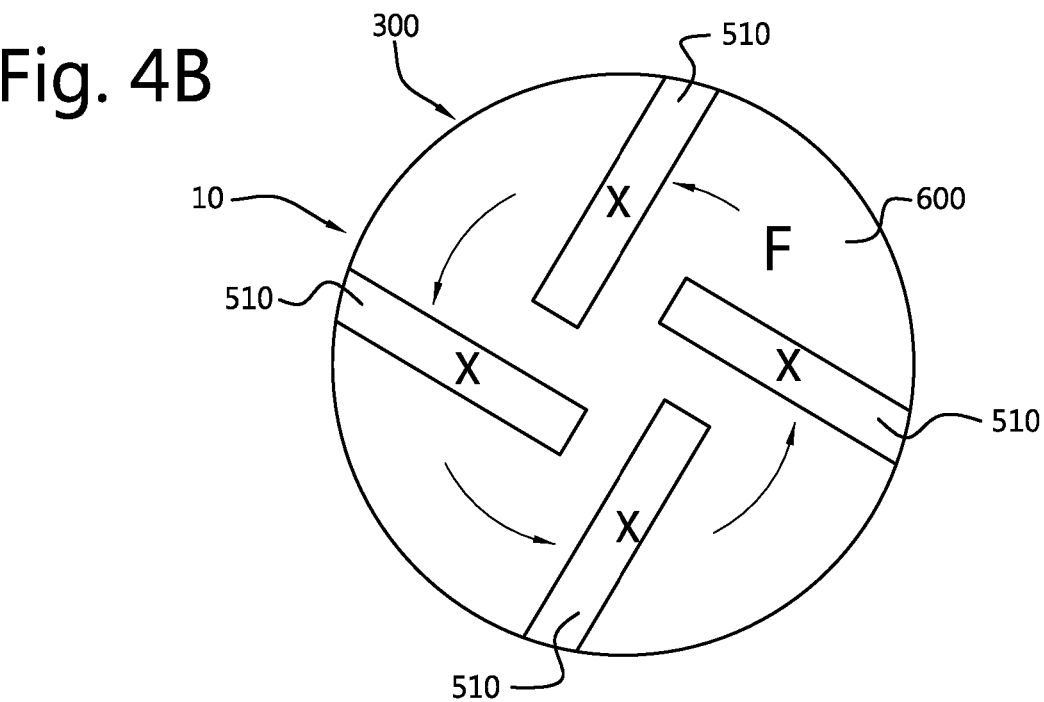

FIGS. 4A and 4B show a top view of a bearing surface of a thrust bearing 10 according to the invention. In FIG. 4A, magnetic field generators 510 are positioned radially, while they are positioned at an angular offset from radial lines in FIG. 4B. In the embodiment shown in FIG. 4B, the agglomerates 121 formed in the obstruction zones form flow obstructions 122 that assist in reducing radially outward leakage of the lubricant 100 from the bearing 10 by forcing the lubricant 100 inwards upon relative rotational motion of the bearing surfaces, besides increasing a load carrying capacity of the bearing 10. This effect is caused by the fact that the orientation of the obstruction zones with respect to the direction of lubricant flow is not perpendicular. The effect is seen when the lubricant flows counterclockwise with respect to the bearing surface 300 shown in FIG. 4B, as indicated by the curved arrows.

Figure 5A:
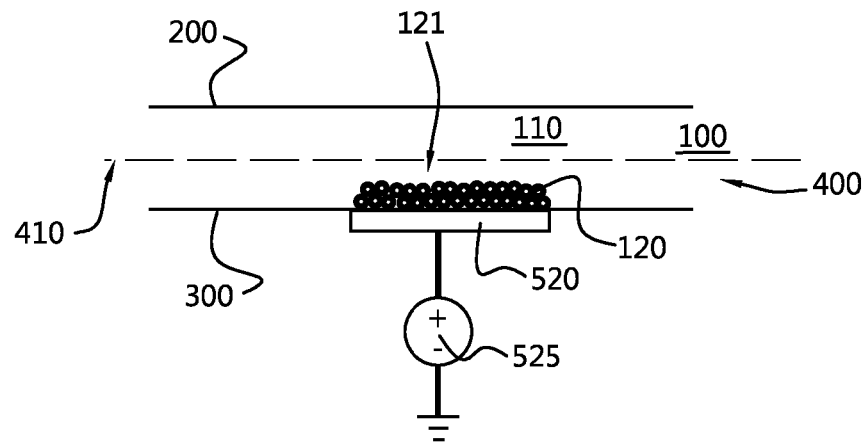
FIGS. 5A-5C show schematic depictions of the behaviour of the lubricant comprising a carrier fluid and particles in a bearing comprising electric field generators.
Figure 5B:
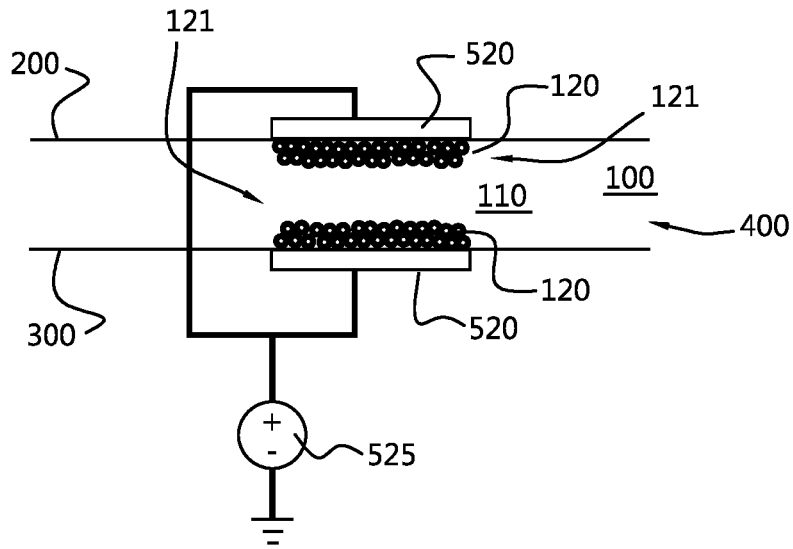
Figure 5C:
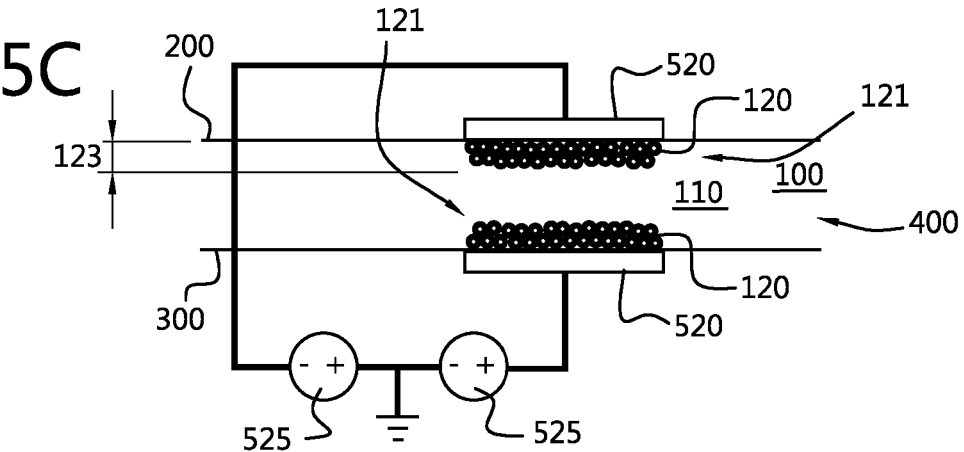

FIGS. 5A-5C show schematic drawings of a side view of a section of the bearing gap 400 for three different embodiments according to the invention, wherein the field generators 500 are electric field activators 520 of which the electric potential is controlled by electric potential sources 525. In all figures, the carrier fluid 110 is electrically non-conducting and kept at zero voltage. Preferably, the particles 120 are non-conductive or coated with a non-conductive outer layer to prevent current flow through chains of particles.

In FIG. 5A, an electric field generator 520 is positioned at one side of the bearing gap 400 only, creating an obstruction zone containing an agglomerate 121 of particles 120 at one side of the bearing gap 400 only. The particles 120 used in this embodiment may be negatively charged particles, permanent electric dipoles, particles wherein an electric dipole moment may be induced by an external electric field or a combination thereof. Particles with a permanent or inducible electric dipole moment experience a net electric force in a spatially varying electric field. Electrically charged particles experience a net electric force in a spatially homogeneous electric field as well.

In FIG. 5B, two electric field generators 520 that are on opposite sides of the bearing gap 400 hold a voltage which is equal in sign. The sign of the voltage is positive in the depicted embodiment but may also be negative. In this embodiment, obstruction zones containing an agglomerate 121 of particles 120 are induced on both sides of the bearing gap 400. The field between the electric field generators 520 is not spatially homogeneous, even for infinite electric field generators, because the electric field generators hold a voltage of the same sign. Therefore, particles 120 with a permanent dipole moment, particles in which a dipole moment is inducible, charged particles, or a combination of these particles may be used. The charged particles should hold a charge with a sign that is opposite to the voltage of the field generators 520 with respect to the lubricant fluid in order to be attracted towards these electric field generators 520. In the embodiment shown in FIG. 5B, the charged particles would hold a negative charge.

In FIG. 5C, two electric field generators 520 which hold a voltage of opposite sign are positioned on opposite sides of the bearing gap 400. The particles 120 used are electrically charged. When all particles hold a charge of the same sign, an obstruction zone containing an agglomerate 121 of particles 120 will be created on one side of the bearing gap 400. When particles of both positive and negative electric charge are used, obstruction zones will be created on both sides of the bearing gap 400, as shown in the figure. If the two field generators 520 are displaced with respect to each other in the direction along which the lubricant 100 flows during operation of the bearing, a component of the electric field in the direction along which the lubricant 100 flows during operation of the bearing 10 will be attained.

Figure 6A:
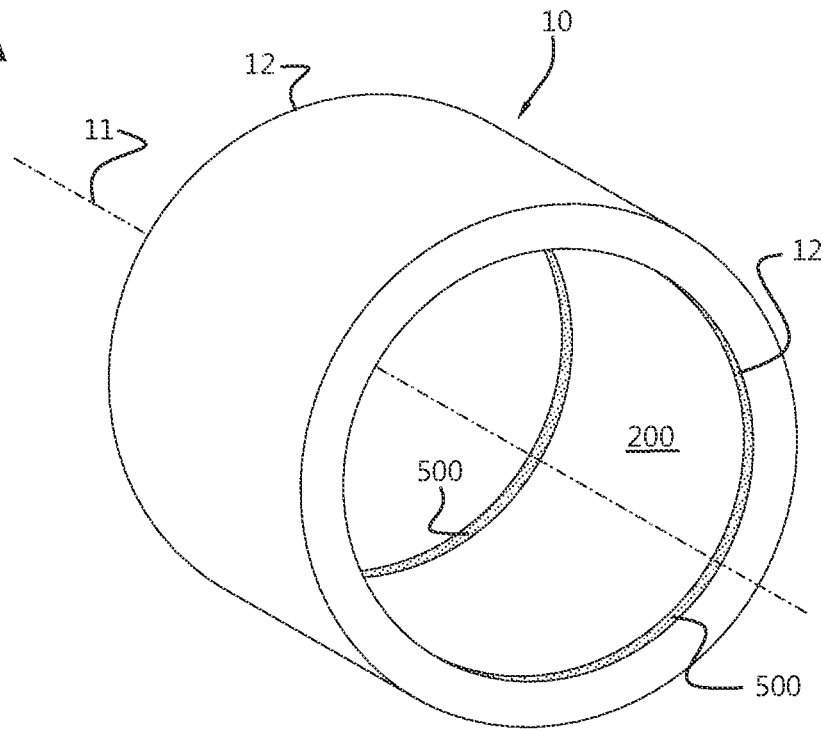
FIGS. 6A-6B show outer bearing parts of a hydrodynamic journal bearing according to the invention.
Figure 6B:
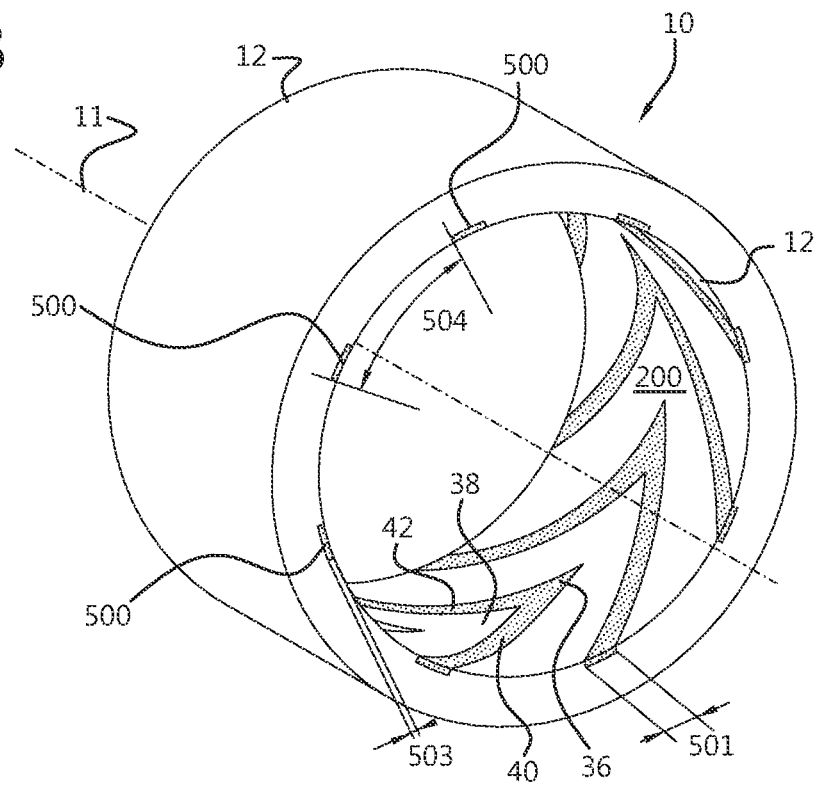

FIGS. 6A-B show an outer part of a journal bearing 10 according to the invention. These bearings rotate around the bearing axis 11. In FIG. 6A, the field generators 500 are placed at the axial bearing ends 12. The flow obstructions 122 are thus created near the axial bearing ends 12, limiting lubricant leakage out of the bearing and increasing pressure of the lubricant inside the bearing gap, enhancing the load carrying capacity of the bearing device 10. FIG. 6B shows field generators 500 that are shaped like arrow heads. The bearing device 10 is configured such that a preferred direction of rotation exists, wherein the lubricant flows in the direction that the arrow heads of the field generators 500 are pointing. As flow obstructions 122 are formed along the field generators 500, lubricant flow perpendicular to the flow obstructions is obstructed.

Upon relative rotational movement of the bearing surfaces 200, 300, lubricant is thus forced axially inwards, towards the points of the arrow heads. This creates an increase in pressure at the axial centre of the bearing gap, increasing the load carrying capacity of the bearing, and decreases leakage of lubricant 100 out of the axial bearing ends 12. It will be clear to the skilled person that other designs of the field generators 500 that provide the same effect are also possible, for example sphere sections, hyperbolas, parabolas, or other shapes where lubricant is forced away from the axial bearing ends 12 when the bearing is rotated in a preferred direction. Similarly, such field generator shapes may be combined with other field generator shapes, for example by combining the field generator layout shown in FIG. 6B with the field generators 500 of FIG. 6A, to further limit leakage of lubricant 100 out of the axial bearing ends 12.

The drawings 6-11 show field generators 500 which are placed some distance from each other. The field generators 500 may also be placed directly adjacent to each other or close to each other. A material of desirable magnetic properties, such as ferromagnetic material 600, or a material of desirable dielectric properties, such as a conductor, may be placed between magnetic field generators 510 and electric field generators 520, respectively. FIGS. 3A-3C show examples of such a layout. The field generators 500 may also be smaller than shown in FIGS. 6-11 in both dimensions in the plane of the bearing surface 200, both in the direction along the direction of relative movement of bearing surfaces and in the direction perpendicular to direction of relative movement of bearing surfaces.

Figure 7:
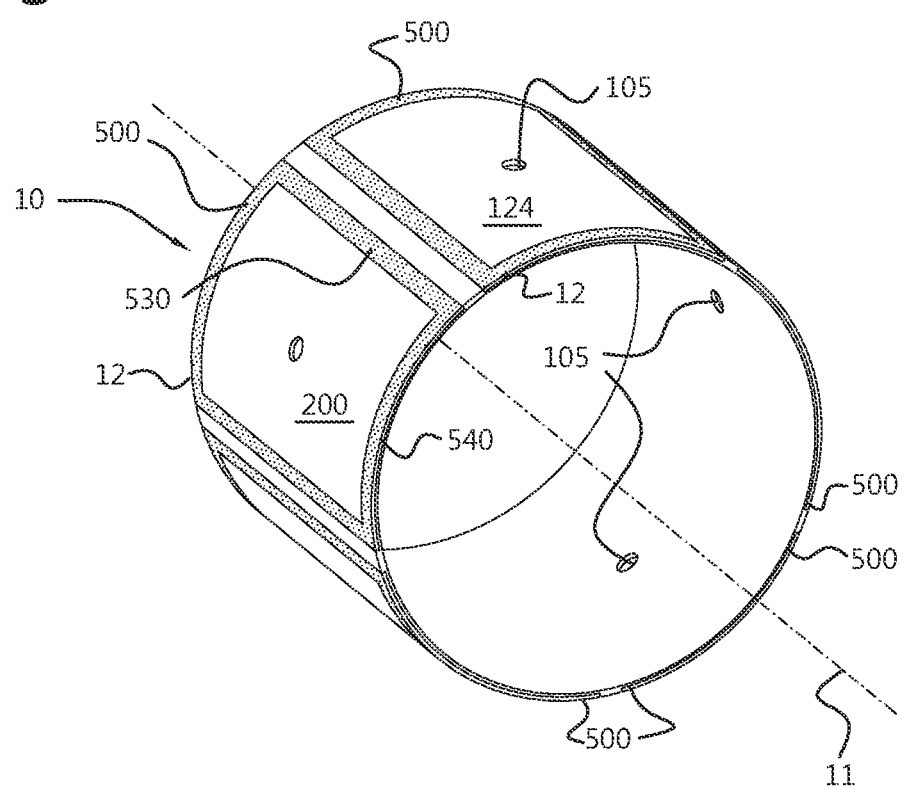
FIG. 7 shows an inner bearing part of a journal bearing according to the invention.

FIG. 7 shows an inner part of a hydrostatic bearing device 10 according to the invention. lubricant 100 is supplied to the bearing gap 400 through lubricant supply inlets 105. The lubricant supply inlets 105 are encircled by field generators 500, creating flow obstructions 122 around the lubricant supply inlets 105. This limits lubricant flow out of a lubricant enclosure region 124, increasing pressure in the lubricant enclosure region. This increased pressure increases the load carrying capacity of the bearing device 10.

Figure 8A:
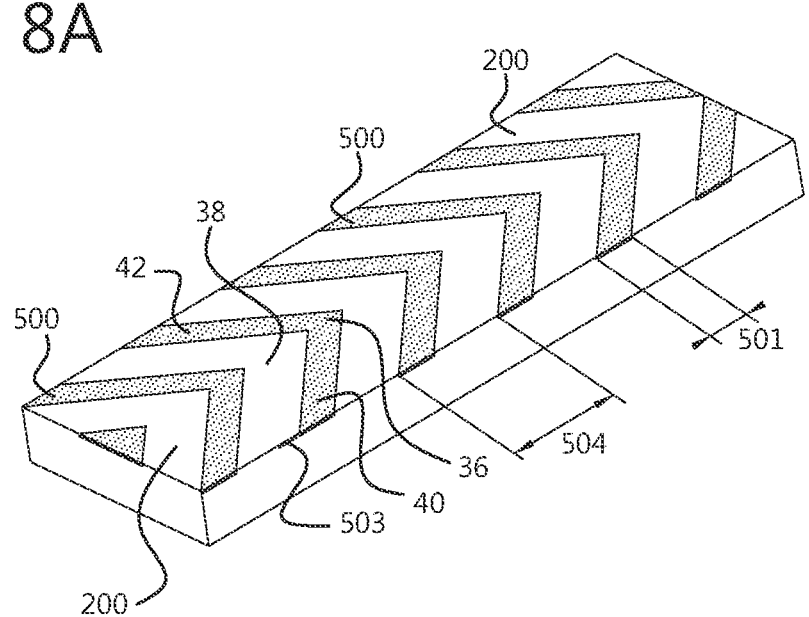
FIGS. 8A-8D show bearing parts according to the invention.
Figure 8B:
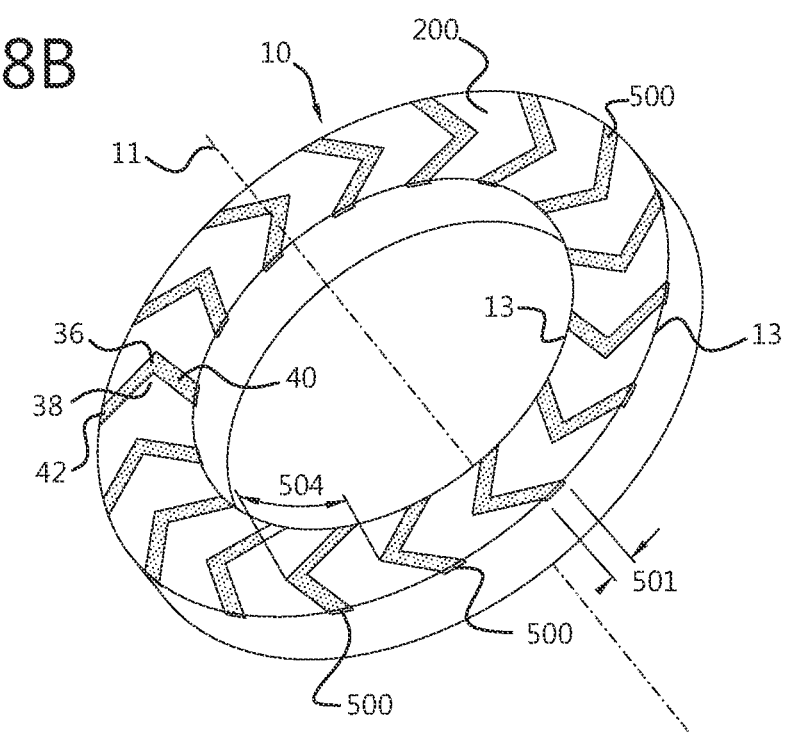
Figure 8C:
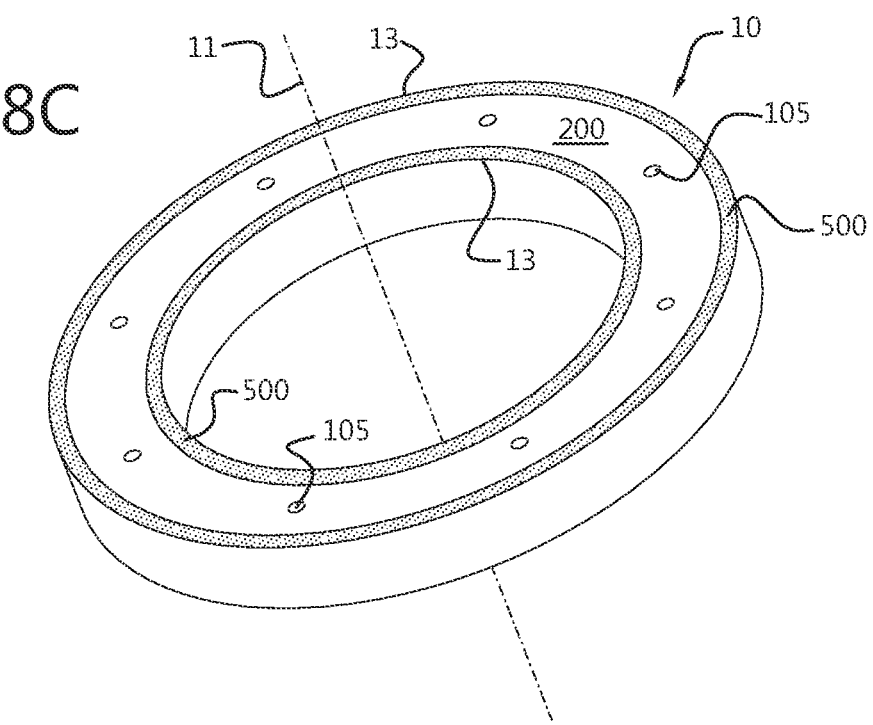
Figure 8D:
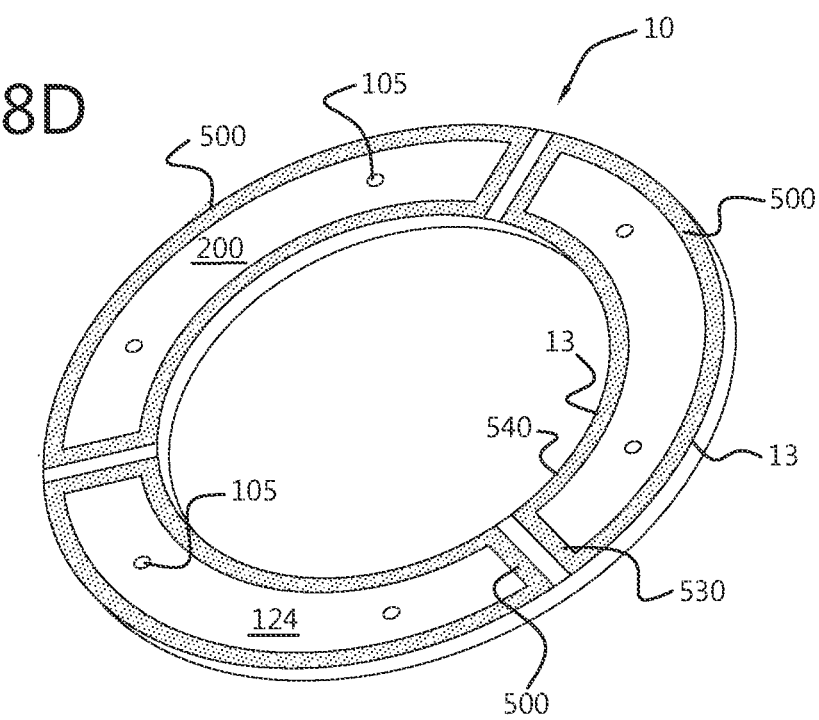

FIGS. 8A-8D show different layouts of the field generators 500 on a bearing surface 200 of a bearing device 10 according to the invention. FIG. 8A shows a part of a linear bearing device using a similar layout of the field generators 500 as the journal bearing device shown in FIG. 6B. FIG. 8B shows a thrust bearing using such a layout of the field generators 500. FIGS. 8C and 8D show parts of hydrostatic thrust bearings according to the invention.

In FIG. 8C, the field generators are positioned at the radial bearing ends 13. Similarly to the device shown in FIG. 6A, this layout reduces leakage of the lubricant 100 out of the bearing ends and yields a higher pressure of the lubricant 100 in the bearing gap 400. When this layout is used in a hydrostatic bearing as shown, a large pressure supply of lubricant 100 through the lubricant supply inlets 105 is possible with little leakage of lubricant 100 through the radial bearing ends 13. This increases the load carrying capacity of the bearing 10.

FIG. 8D shows a bearing device 10 similar to the one shown in FIG. 8C, further including main flow obstructing field generator sections 530 that are perpendicular to the direction of fluid flow in the plane of the bearing surface 200, besides the leakage obstructing sections 540 that are parallel to the direction of fluid flow in the plane of the bearing surface. As the field generators 500 and therefore the flow obstructions 122 fully encircle the lubricant supply inlets 105, lubricant flow out of the lubricant enclosure regions 124 is inhibited. The main flow obstructing sections 530 locally increase the lubricant pressure when it flows through them, increasing the load carrying capacity of the bearing. The leakage obstructing sections 540 inhibit flow of lubricant 100 out if the radial bearing ends, reducing lubricant leakage and increasing lubricant pressure in the bearing gap 400, further increasing the load carrying capacity of the bearing.

Figure 9A:
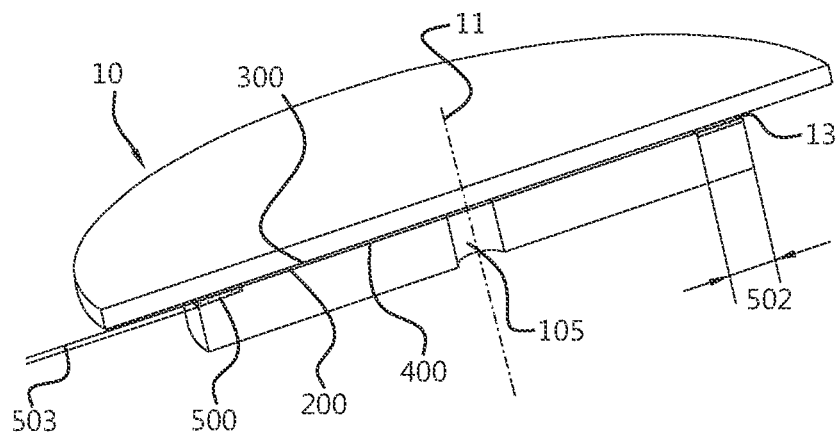
FIGS. 9A-9B show an axial cross-section of a bearing according to the invention.
Figure 9B:
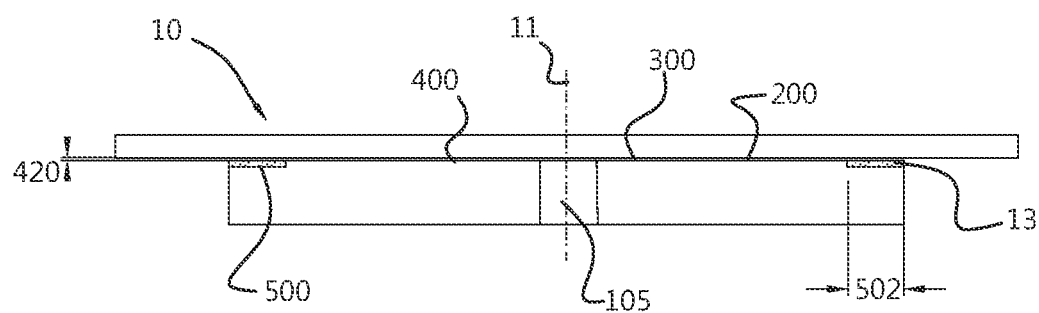

FIGS. 9A-B show an axial cross-section of a thrust bearing 10 according to the invention with an axial lubricant supply inlet 105. The ring-shaped field generator 500 is concentric with the bearing surface 200 in which it is embedded and has a depth in the direction of the bearing gap 503 that is similar to the bearing gap height 420. when this dimension of the field generators is large with respect to the bearing gap, a more homogeneous field is created within the bearing gap. This is undesirable when the particles 120 in the lubricant 100 are magnetic or magnetisable or when they comprise permanent or inducible electric dipole moments, as the respective magnetic or electric force on these particles depends on the gradient of the respective magnetic or electric field. When particles 120 with a permanent or inducible dipole moment are used, the field generators 500 should thus be made as small as practically feasible for optimal results. In practice, this entails that applying small field generators 500 of unequal polarization adjacent to each other yields good results. See e.g. FIGS. 2G-2J and 3A-3C. Consequently, multiple small ring-shaped field generators 500 of unequal polarization may be placed concentrically in the bearing device 10 shown in FIGS. 9A-9B.

Figure 10A:
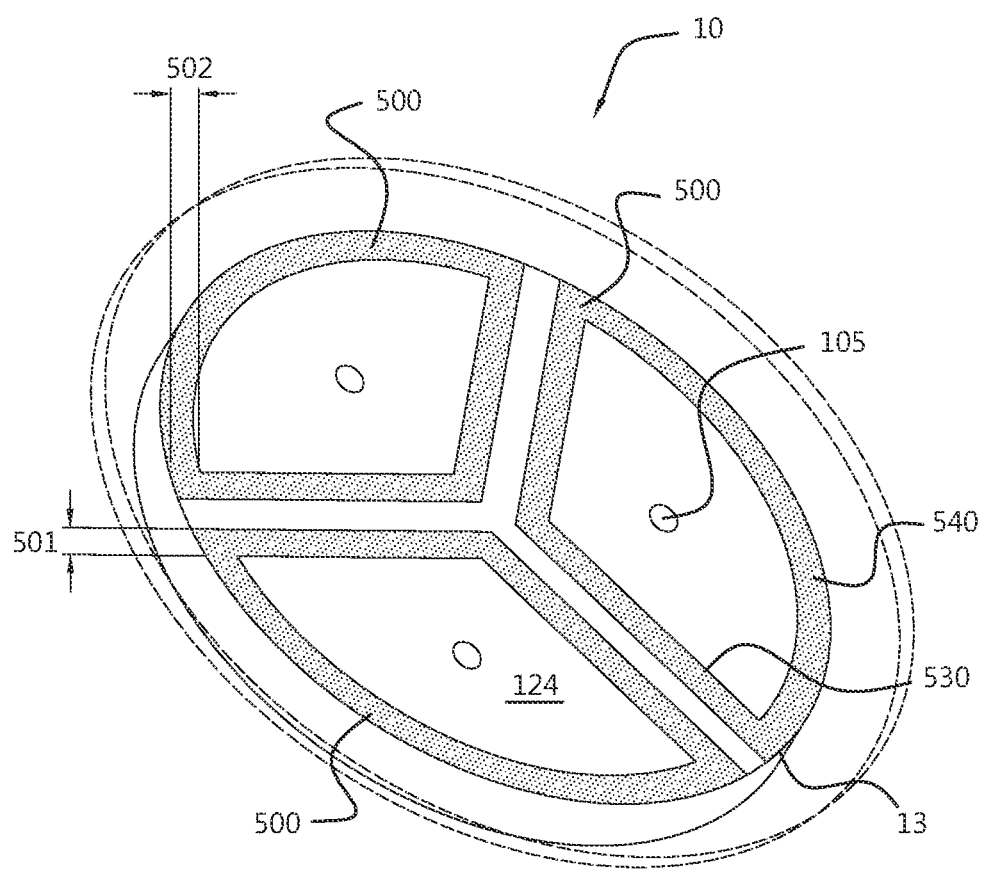
FIGS. 10A-10B show a hydrostatic thrust bearing according to the invention.
Figure 10B:
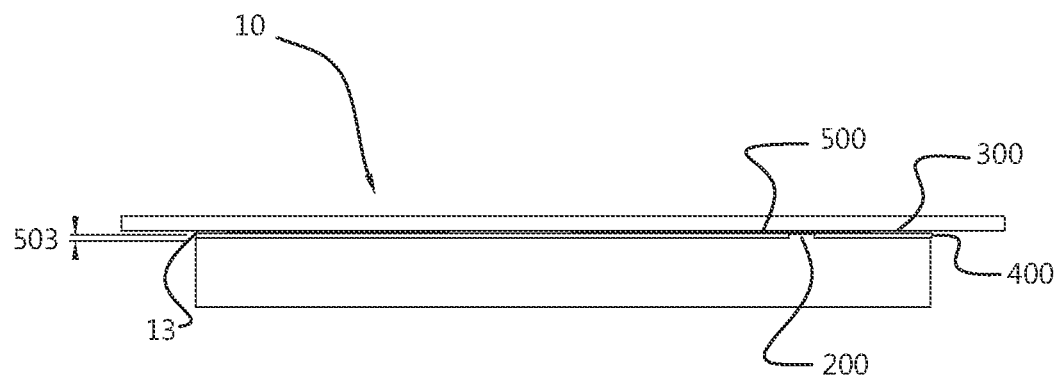

FIGS. 10A-10B show a hydrostatic thrust bearing device 10 according to the invention, wherein one of the bearing parts is translucent in order to view the bearing surface 200 in which the field generators 500 are embedded. As the field generators 500 and therefore the flow obstructions 122 fully encircle the lubricant supply inlets 105, lubricant flow out of the lubricant enclosure regions 124 is inhibited. This increases the pressure in the bearing gap 400 in the lubricant enclosure regions 124, increasing the load carrying capacity of the bearing.

Figure 11A:
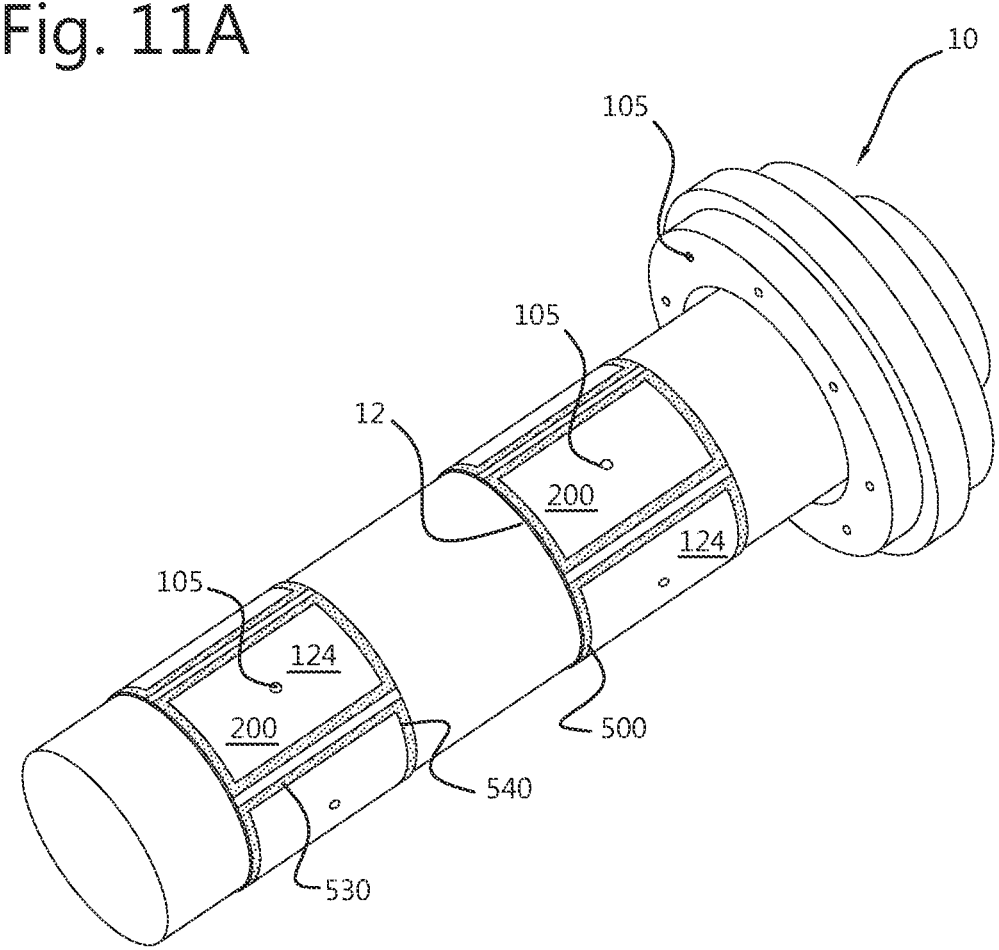
FIGS. 11A-11B show a bearing device according to the invention.
Figure 11B:
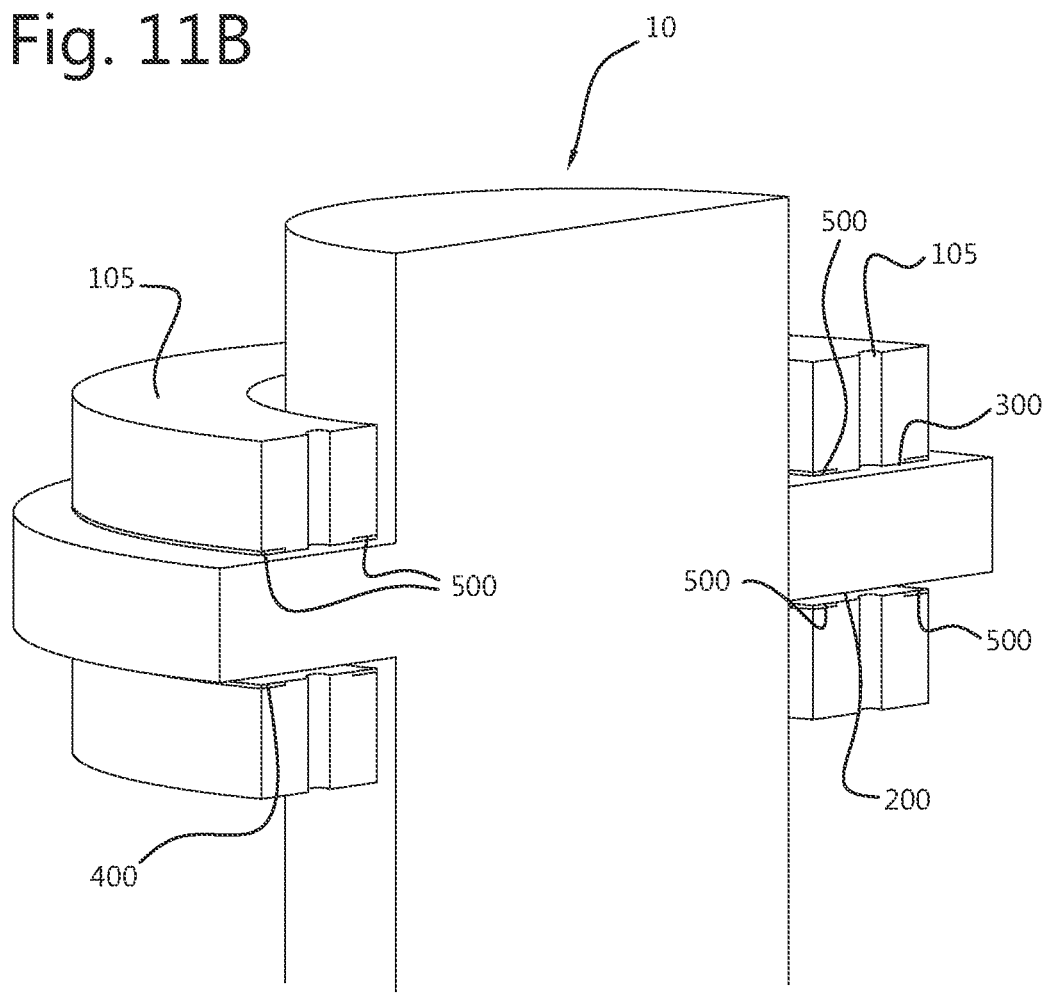

FIGS. 11A-B show a combined bearing device 10 according to the invention, wherein a thrust bearing is combined with a journal bearing. FIG. 11B shows an axial cross-section of the thrust bearing. This thrust bearing resists axial loads in both directions. Both the journal bearings and the thrust bearings comprise lubricant supply inlets 105.

FIGS. 6-11 seem similar to figures disclosed in WO2018212657A1. Key differences lie in the size and shape of the field generators 500. in WO2018212657A1, the bearing device 10 is designed such that the strength of a magnetic field in the bearing gap has a certain value. In the present invention, it is not the magnetic field strength, but the spatial gradient of the magnetic field that is the relevant quantity. This requires different designs for the field generators 500. The field generators in FIGS. 6-11 are thinner in the direction of the bearing gap, as can be seen when the figures of WO2018212657A1 are compared to the figures of the present disclosure.

Figure 12A:
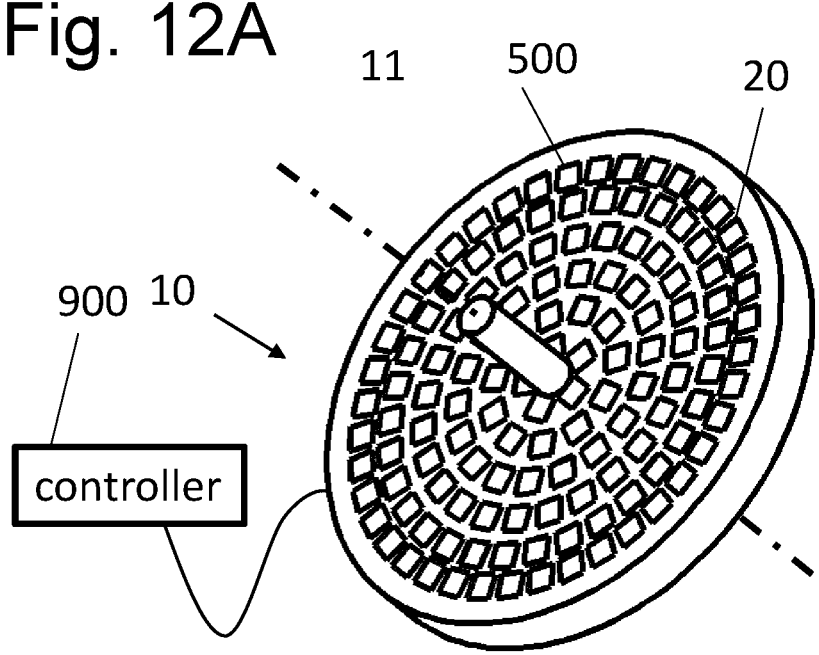
FIGS. 12A-12D show a bearing part of a thrust bearing according to the invention.

FIGS. 12A-12D show a bearing part of a thrust bearing according to the invention. The bearing part comprises multiple field generators 500, laid out in a pixel like grid on the first bearing surface 200, as shown in FIG. 12A.

Figure 12B:
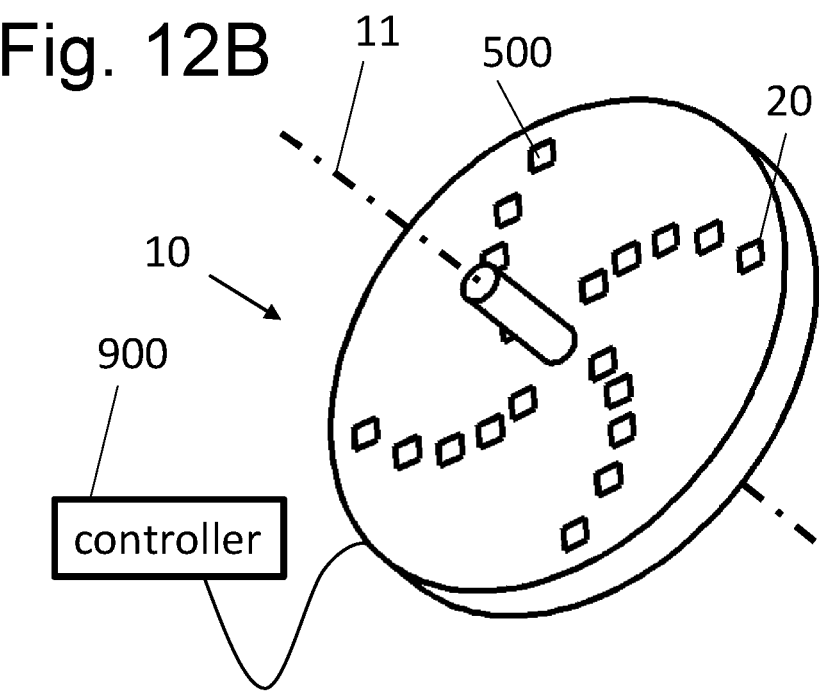
Figure 12C:
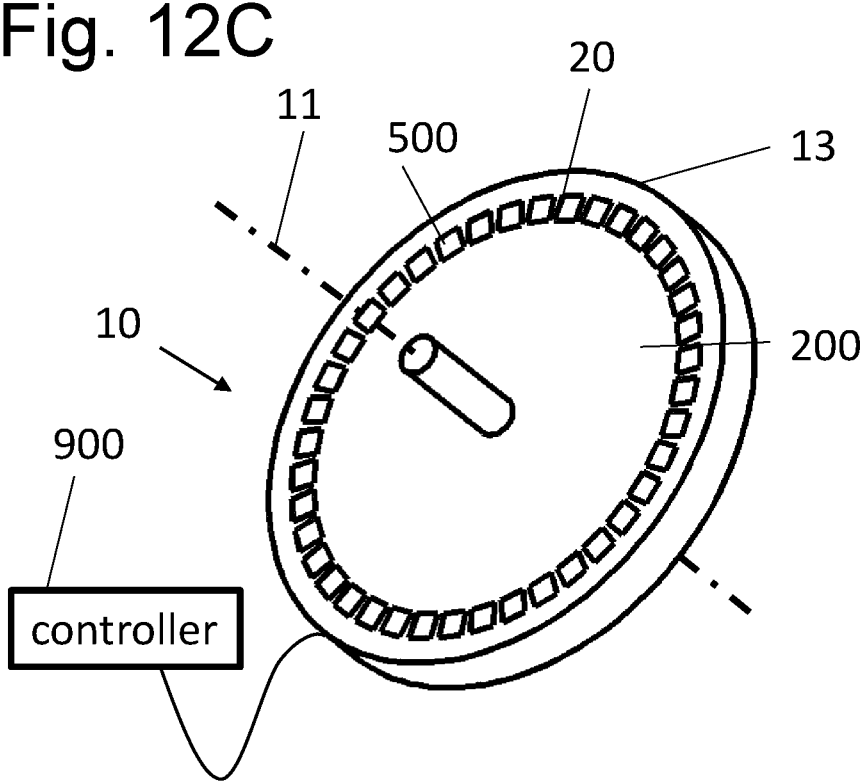
Figure 12D:
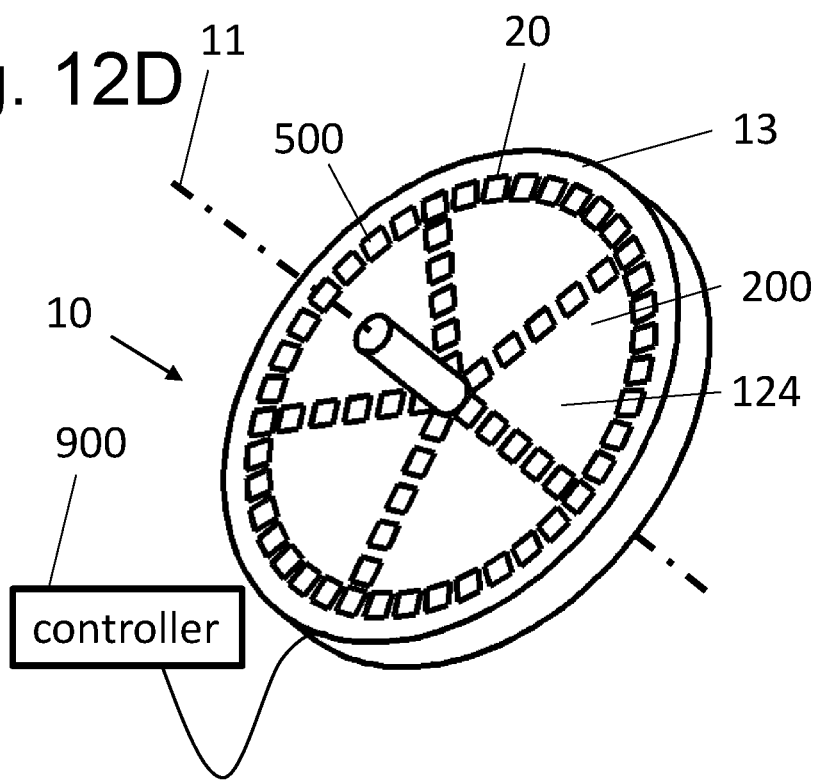

The field generators 500 are controllable to form three different patterns of activated field generators on the first bearing surface 200, shown in FIGS. 12B, 12C, and 12D. Activating the field generators 500 in a particular shape yields obstruction zones in that same shape. In FIGS. 12C, 12B, and 12D, only the activated field generators are shown.

Instead of field generators 500, activators 20 may be used in combination with a suitable lubricant 100. These may be, for example, heating and/or cooling elements combined with a lubricant which has a temperature dependent viscosity or slip velocity controlling activators 20 combined with a lubricant having a controllable slip velocity. Furthermore, a magnetorheological lubricant or an electrorheological lubricant may be used in combination with field generators 500 which create fields with no appreciable spatial gradient.

FIG. 12B shows the bearing part of FIG. 12A, wherein the field generators 500 are controlled to form a fan like shape. In use, this yields local flow obstructions in the fan-like shape, which decreases leakage of lubricant 100 through the radial bearing end 13 and increases a load carrying capacity of the bearing by locally increasing lubricant pressure.

FIG. 12C shows the bearing part of FIG. 12A, wherein the field generators 500 are controlled to form a circle at the radial bearing end 13. In use, this yields local flow obstructions in the circle shape, which decreases leakage of lubricant 100 out of the radial bearing end 13.

FIG. 12D shows the bearing part of FIG. 12C, wherein additional field generators 500 are controlled to form a star like shape. In use, this yields local flow obstructions in the star-like shape, which increases a load carrying capacity of the bearing by locally increasing lubricant pressure.

In the embodiment of FIGS. 12A-12D, each of the field generators 500 is individually controllable by a controller 900. This way, a variety of shapes of obstruction zones may be created, dependent on various conditions such as bearing load, speed and wear condition. Alternatively, the field generators 500 may be divided in multiple field generator groups, wherein the field generator groups comprise at least a first field generator group 505 and a second field generator group 506. The field generators 500 of a field generator group are controllable independently from field generators 500 of another field generator group by the controller 900, wherein the field generators 500 of the first field generator group 505 are controllable to form the first pattern 700 of activated field generators and wherein the field generators 500 of the second field generator 506 group are controllable to form the second pattern 702 of activated field generators. This provides less flexibility than individually controlling each field generator 500, but may allow simplified construction and control of the bearing device 10, especially of the controller 900. The controller may control the bearing device 10 based on sensor input or user input.

Figure 13A:
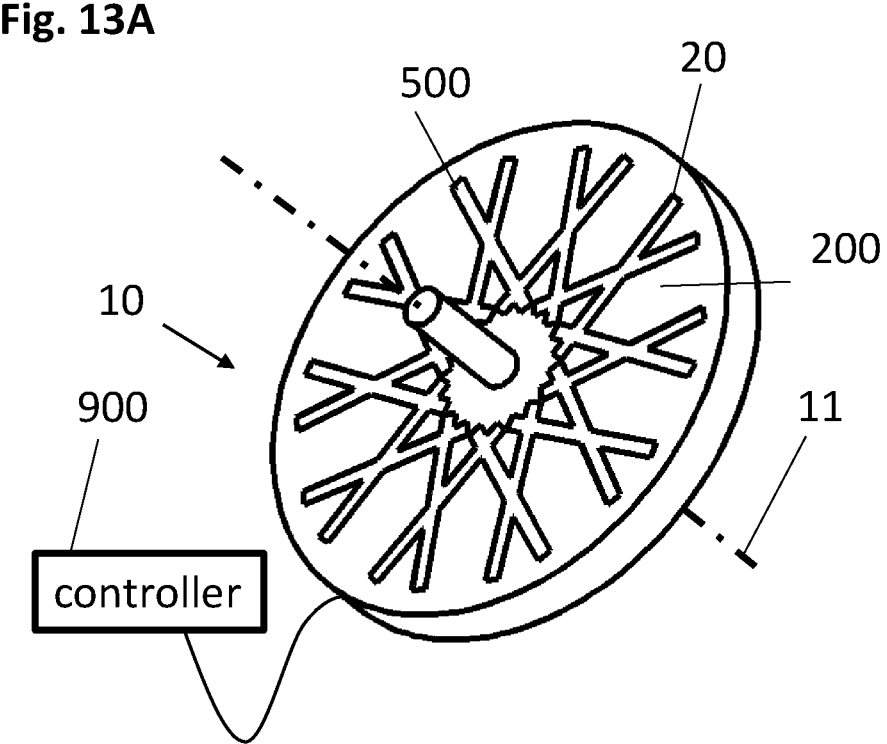
FIGS. 13A-13C show a bearing part of a thrust bearing according to the invention.
Figure 13B:
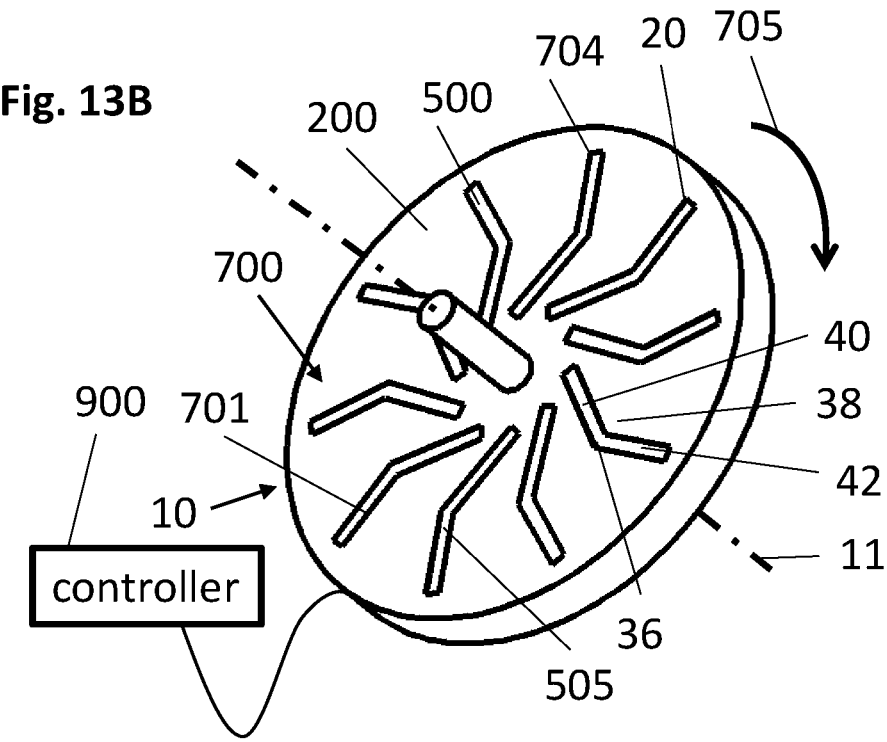
Figure 13C:
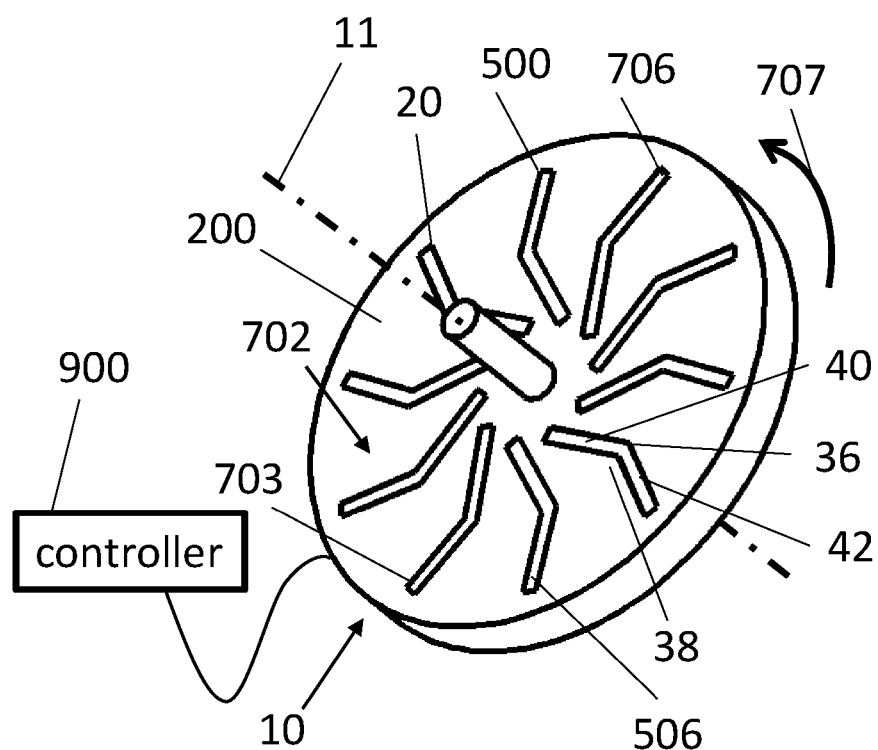

Such a bearing device 10 is shown in FIGS. 13A-13C, where a bearing part of a thrust bearing according to the invention is shown. FIG. 13A shows a bearing part of a thrust bearing according to the invention wherein all field generators 500 are shown. FIG. 13B shows the bearing part of FIG. 13A, wherein only the field generators 500 of the first field generator group 505 are shown. FIG. 13C shows the bearing part of FIG. 13A, wherein only the field generators 500 of the second field generator group 506 are shown.

The first shape 701 defines a top 36 which is directed in a first shape direction 705. The obstruction zone associated with the field generators 500 of the first activator group is configured to cause a local rise of a pressure of the lubricant within the bearing gap in the non-obstruction zone which is located upstream of each obstruction zone and in particular in a peak zone 38 which is located directly upstream of each top 36. The second shape 703 defines a top 36 which is directed in a second shape direction 706. The obstruction zone associated with the field generators of the second field generator group is configured to cause a local rise of a pressure of the lubricant within the bearing gap in the non-obstruction zone which is located upstream of each obstruction zone and in particular in a peak zone 38 which is located directly upstream of each top 36. Each obstruction zone comprises a left section 42 and a right section 40, wherein the left and right section direct the lubricant towards the peak zone 38.

The first shape 701 comprises one or more first arrow heads 704 pointing in a first shape direction 705, while the second shape 703 comprises one or more second arrow heads 706 pointing in a second shape direction 707. The second shape direction 707 is an opposite direction of the first shape direction 705. Switching between the first field generator group 505 and the second field generator group 506 allows adjusting for two rotation directions of the thrust bearing, wherein the arrow heads 704, 706 preferably point in the direction of lubricant flow. This decreases leakage of lubricant 100 through the radial bearing end 13 and increases a load carrying capacity of the bearing by locally increasing lubricant pressure. The skilled person will understand that shapes other than arrow heads are also possible.

Figure 14A:
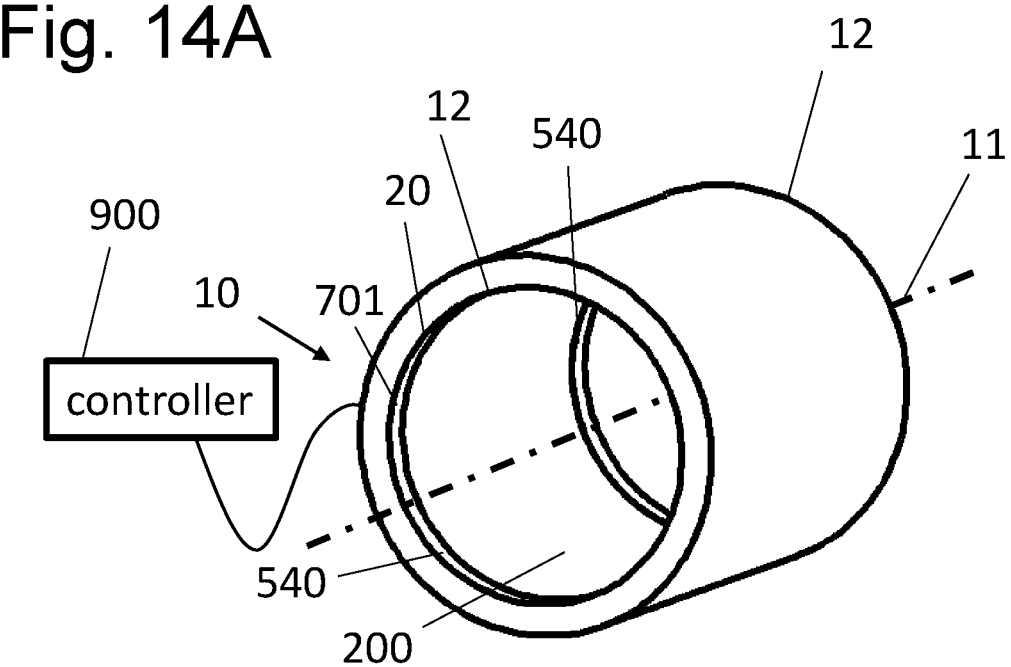
FIGS. 14A and 14B show an outer bearing part of a journal bearing according to the invention.

FIG. 14A shows an outer bearing part of a journal bearing according to the invention, wherein the field generators 500 are divided in two groups. Only the field generators 500 of the first field generator group 505 are shown. The first shape 701 is elongated in a direction parallel to the direction of relative movement between the bearing surfaces, such that closed rings are formed at both of the axial bearing ends 12. The field generators 500 of the first field generator group 505 are configured to create at least one local flow obstruction, wherein the obstruction zone of said at least one local flow obstruction is configured to obstruct lubricant flow out of the bearing through a bearing end, in this case an axial bearing end 12.

Figure 14B:
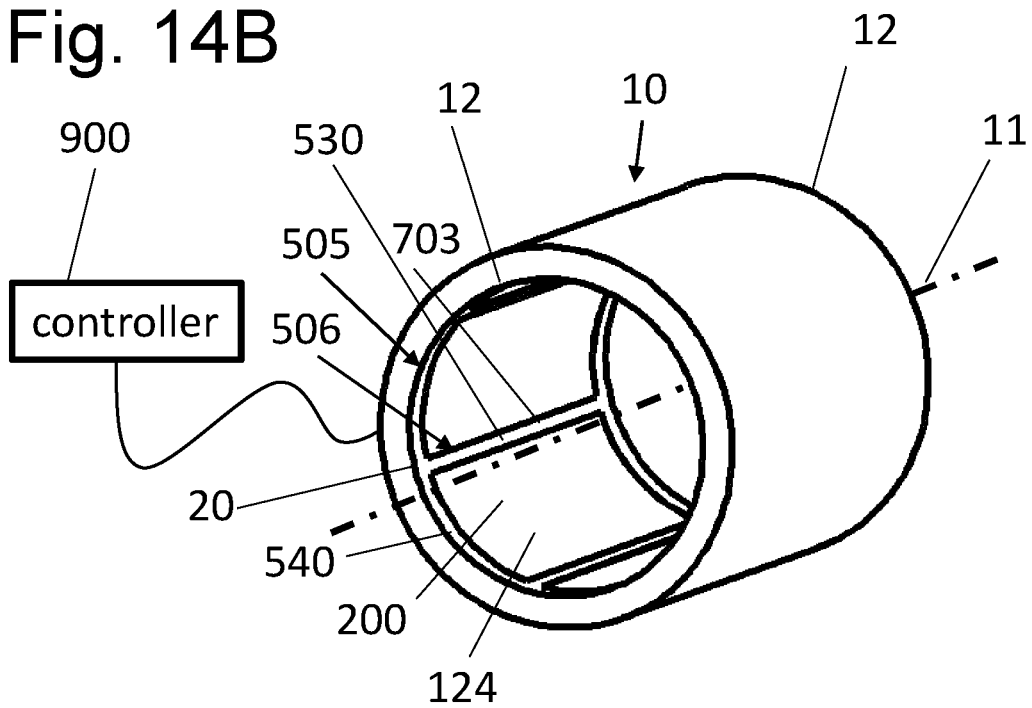

FIG. 14B shows the outer bearing part of FIG. 14A, wherein additionally the field generators 500 of the second field generator group 506 are shown. The second shape 703 is elongated in a direction perpendicular to the direction of relative movement between the bearing surfaces and to the direction perpendicular to the bearing surfaces. The second shape 703 comprises multiple lines which are parallel to the bearing rotational axis 11. The field generators 500 of the second field generator group 506 are configured to create at least one local flow obstruction, wherein the obstruction zone of said at least one local flow obstruction is configured to obstruct lubricant flow in the direction along which the first and second bearing surfaces move with respect to each other, thereby creating a local increase in pressure which increases a load carrying capacity of the bearing.

The FIGS. 12-14 discussed above depict embodiments using a lubricant 100, wherein the lubricant comprises a carrier fluid 110 and particles 120 which respond to magnetic or electric fields. The skilled person will understand that the mechanisms discussed with reference to these figures concerning control of the field generators are also applicable to embodiments wherein the lubricant comprises a magnetorheological fluid, an electrorheological fluid, a fluid with a temperature dependent viscosity, or a fluid with a controllable slip velocity. In embodiments using a lubricant comprising a fluid with a temperature dependent viscosity or a fluid with a controllable slip velocity, the field generators (500) are replaced by activators (20), wherein the activators (20) heat and/or cool the lubricant or control the slip velocity of the lubricant, respectively.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. A bearing device, comprising:
a first bearing surface and a second bearing surface which are moveable relative to one another and which face one another, wherein the first bearing surface and the second bearing surface are separated by a bearing gap filled with a lubricant, wherein the lubricant comprises a carrier fluid and particles which respond to magnetic fields, wherein said particles are suspended in the carrier fluid in the absence of magnetic fields; and
one or more field generators which are embedded in the first or second bearing surface, wherein the field generators are magnetic field generators configured to generate a localized spatially varying magnetic field which is configured to locally remove the particles from suspension by exerting a field force on the particles, thereby forming a local flow obstruction on at least one of the bearing surfaces in the form of an agglomerate of previously suspended particles, wherein the local flow obstruction is configured to locally obstruct a flow of the lubricant through the bearing gap in an obstruction zone.

2. The bearing device according to claim 1, wherein the one or more field generators are configured to position the agglomerate against at least one of the first bearing surface and the second bearing surface, and wherein the one or more field generators are configured to position the agglomerate such that it is stationary with respect to said one of the first bearing surface and the second bearing surface.

3. The bearing device according to claim 1, wherein the one or more field generators are configured to form the local flow obstruction with an obstruction height in a direction of the bearing gap, wherein said obstruction height is smaller than a bearing gap height, wherein the direction of the bearing gap is defined as pointing along a straight line that is perpendicular to both the first bearing surface and the second bearing surface.

4. The bearing device according to claim 1, wherein a field strength of the field generated by the one or more field generators varies in a direction of the bearing gap, wherein the field strength on one side of the bearing gap is at least 25 percent higher than in the centre of the bearing gap, wherein the direction of the bearing gap is defined as pointing along a straight line that is perpendicular to both the first bearing surface and the second bearing surface.

5. The bearing device according to claim 1, wherein a field strength of the field generated by the one or more field generators varies along a direction in which the lubricant flows during operation, wherein the field strength varies by least 25 percent in a distance equal to half a bearing gap height along the direction in which the lubricant flows during operation.

6. The bearing device according to claim 1, wherein at least one field generator is elongated in a direction parallel to the direction of relative movement between the bearing surfaces, wherein the obstruction zones of local flow obstructions associated with said at least one field generator are configured to obstruct lubricant flow out of the bearing through a bearing end.

7. The bearing device according to claim 1, wherein the one or more field generators are not placed directly adjacent to each other, wherein a ferromagnetic material is interposed between adjacent magnetic field generators.

8. The bearing device according to claim 1, wherein a pitch of the field generators in the direction of the relative motion of the bearing surfaces is less than 20 times a bearing gap height.

9. The bearing device according to claim 1, wherein the one or more field generators are configured such that the obstruction zones leave an open channel with a height that is less than 80 percent of a bearing gap height.

10. A bearing device, comprising:
a first bearing surface and a second bearing surface which are moveable relative to one another and which face one another, wherein the first bearing surface and the second bearing surface are separated by a bearing gap filled with a lubricant, wherein the lubricant comprises a carrier fluid and particles which respond to electric fields, wherein said particles are suspended in the carrier fluid in the absence of electric fields; and
one or more field generators which are embedded in the first or second bearing surface, wherein the field generators are electric field generators configured to generate a localized electric field which is configured to locally remove the particles from suspension by exerting a field force on the particles, thereby forming a local flow obstruction on at least one of the bearing surfaces in the form of an agglomerate of previously suspended particles, wherein the local flow obstruction is configured to locally obstruct a flow of the lubricant through the bearing gap in an obstruction zone.

11. The bearing device according to claim 10, wherein the one or more field generators are configured to position the agglomerate against at least one of the first bearing surface and the second bearing surface and wherein the one or more field generators are configured to position the agglomerate such that it is stationary with respect to said one of the first bearing surface and the second bearing surface.

12. The bearing device according to claim 10, wherein the one or more field generators are configured to form the local flow obstruction with an obstruction height in a direction of the bearing gap, wherein said obstruction height is smaller than a bearing gap height, wherein the direction of the bearing gap is defined as pointing along a straight line that is perpendicular to both the first bearing surface and the second bearing surface.

13. The bearing device according to claim 10, wherein at least one field generator is elongated in a direction parallel to the direction of relative movement between the bearing surfaces, wherein the obstruction zones of local flow obstructions associated with said at least one field generator are configured to obstruct lubricant flow out of the bearing through a bearing end.

14. The bearing device according to claim 10, wherein the one or more field generators are not placed directly adjacent to each other, wherein an electrically conductive material or an electrically insulating material is interposed between adjacent electric field generators.

15. The bearing device according claim 10, wherein a pitch of the one or more field generators in the direction of the relative motion of the bearing surfaces is less than 20 times a bearing gap height.

16. The bearing device according to claim 10, wherein the one or more field generators are configured such that the obstruction zones leave an open channel with a height that is less than 80 percent of a bearing gap height.

17. A method of moving two surfaces relative to one another using a bearing device, the bearing device comprising:
   a first bearing surface and a second bearing surface which face one another; and
   one or more field generators which are embedded in the first or second bearing surface, wherein the field generators are magnetic field generators;
   wherein the method comprises the steps of:
   separating the first bearing surface and the second bearing surface by a bearing gap;
   filling the bearing gap with a lubricant comprising a carrier fluid and particles which respond to magnetic fields, wherein said particles are suspended in the carrier fluid in the absence of magnetic fields;
   moving the first bearing surface with respect to the second bearing surface; and
   generating a localized spatially varying magnetic field using the magnetic field generators to locally remove the particles from suspension by exerting a field force on the particles, thereby creating a local flow obstruction on at least one of the bearing surfaces in the form of an agglomerate of previously suspended particles, wherein a thickness of the local flow obstruction in a direction of the bearing gap is a fraction of a bearing gap height in at least one obstruction zone in the bearing gap, thereby locally obstructing a flow of the lubricant through the bearing gap in the obstruction zone.

18. The method according to claim 17, wherein the method comprises the step of varying the thickness of the local flow obstruction depending on conditions such as radial or axial bearing load, speed of relative movement of the bearing surfaces, relative position of bearing parts, and bearing wear.

19. The method according to claim 17, wherein the method comprises the step of varying a spatial gradient of the magnetic field.

20. The method according to claim 19, wherein the method comprises the step of varying a size of the agglomerates by varying the spatial gradient of the magnetic field.

21. A method for allowing relative movement of two surfaces using a bearing device, the bearing device comprising:
   a first bearing surface and a second bearing surface which face one another; and
   one or more field generators which are embedded in the first or second bearing surface, wherein the field generators are electric field generators;
   wherein the method comprises the steps of:
   separating the first bearing surface and the second bearing surface by a bearing gap;
   filling the bearing gap with a lubricant comprising a carrier fluid and particles which respond to electric fields, wherein said particles are suspended in the carrier fluid in the absence of electric fields;
   moving the first bearing surface with respect to the second bearing surface; and
   generating a localized electric field using the electric field generators to locally remove the particles from suspension by exerting a field force on the particles, thereby creating a local flow obstruction on at least one of the bearing surfaces in the form of an agglomerate of previously suspended particles, wherein a thickness of the local flow obstruction in a direction of the bearing gap is a fraction of a bearing gap height in at least one obstruction zone in the bearing gap, thereby locally obstructing a flow of the lubricant through the bearing gap in the obstruction zone.

22. The method according to claim 21, wherein the method comprises the step of varying the thickness of the local flow obstruction depending on conditions such as radial or axial bearing load, speed of relative movement of the bearing surfaces, relative position of bearing parts, and bearing wear.

23. The method according to claim 21, wherein the method comprises the step of varying a spatial gradient of the electric field.

24. The method according to claim 23, wherein the method comprises the step of varying a size of the agglomerates by varying the spatial gradient of the electric field.

* * * * *